United States Patent [19]

Fujita et al.

[11] Patent Number: 4,468,693

[45] Date of Patent: Aug. 28, 1984

[54] VIDEO PRINTING APPARATUS

[75] Inventors: Shuji Fujita, Funabashi; Kennosuke Sugizaki, Hachioji; Keiichi Kiyota, Kawasaki, all of Japan

[73] Assignees: Dai Nippon Printing Co., Ltd.; Ikegami Tsushinki Co., Ltd., both of Tokyo, Japan

[21] Appl. No.: 398,243

[22] Filed: Jul. 14, 1982

[30] Foreign Application Priority Data

| Jul. 14, 1981 | [JP] | Japan | 56-108784 |
| Aug. 10, 1981 | [JP] | Japan | 56-125000 |
| Aug. 20, 1981 | [JP] | Japan | 56-129405 |
| Dec. 4, 1981 | [JP] | Japan | 56-195325 |
| Dec. 5, 1981 | [JP] | Japan | 56-195111 |
| Dec. 5, 1981 | [JP] | Japan | 56-195112 |
| May 18, 1982 | [JP] | Japan | 57-82368 |

[51] Int. Cl.³ .......................... H04N 1/46; G03F 3/08
[52] U.S. Cl. ........................................ 358/78; 358/75
[58] Field of Search ....................... 358/75, 76, 77, 78, 358/332, 334

Primary Examiner—John C. Martin
Assistant Examiner—Luan Nguyen
Attorney, Agent, or Firm—Spencer & Frank

[57] ABSTRACT

A video printing apparatus for forming color separation films and a color film recording an image of a video signal of a desired frame is disclosed. The video signal is once recorded on a 1" video tape together with time codes denoting respective frames. The video signal of the extracted frame is processed by time error corrector, a noise reducer and a detail corrector and then the thus corrected video signal is converted into R, G, B signals which are then stored in frame memories. The color signals stored in the frame memories are successively read out and are supplied to an interpolator composed of a hard logic circuit to produce interpolated color signals composed of a great number of scanning lines. The interpolation can be effected by one of cubic convolution, bilinear and nearest neighbor methods in dependence upon a kind of the image to be interpolated. The interpolated color signals are supplied to an electronic color scanner for forming cyan, magenta, yellow and black color separation films. The interpolated color signals are supplied to a color photography unit in which successive color signals are displayed on a flying spot scanner tube and displayed images are projected onto a color photographic film by means of red, green and blue color filters, respectively. The color signals are read out of the frame memories at timings corresponding to scanning speeds of the color scanner and the color photography unit.

44 Claims, 34 Drawing Figures

Parallel Shift

Contrast

Middle Tone

High Light

Shadow

FIG.12A

Line: n, n+1, n+2, n+3

1. $P_{11}$ $P_{12}$ $P_{13}$ $P_{14}$ RAM-1
2. $P_{21}$ $P_{22}$ $P_{23}$ $P_{24}$ RAM-2
                   $X_1$
3. $P_{31}$ $P_{32}$ $P_{33}$ $P_{34}$ RAM-3
                   $X_2$
4. $P_{41}$ $P_{42}$ $P_{43}$ $P_{44}$ RAM-4
                   $X_3$
5. $P_{51}$ $P_{52}$ $P_{53}$ $P_{54}$
                   $X_4$
6. $P_{61}$ $P_{62}$ $P_{63}$ $P_{64}$
                   $X_5$
7. $P_{71}$ $P_{72}$ $P_{73}$ $P_{74}$
8. $P_{81}$ $P_{82}$ $P_{83}$ $P_{84}$

FIG.12B

| A′ | | | | |
|---|---|---|---|---|
| $\alpha_{11}$ | $\alpha_{12}$ | $\alpha_{13}$ | $\alpha_{14}$ | ROM-1 |
| B′ | | | | |
| $\alpha_{21}$ | $\alpha_{22}$ | $\alpha_{23}$ | $\alpha_{24}$ | ROM-3 |
| C′ | | | | |
| $\alpha_{31}$ | $\alpha_{32}$ | $\alpha_{33}$ | $\alpha_{34}$ | ROM-4 |
| D′ | | | | |
| $\alpha_{41}$ | $\alpha_{42}$ | $\alpha_{43}$ | $\alpha_{44}$ | ROM-5 |

FIG.12C

| Combination / Interpolation Region | $X_1$ | | $X_2$ | | $X_3$ | | $X_4$ | | $X_5$ | |
|---|---|---|---|---|---|---|---|---|---|---|
| RAM \ ROM | RAM | ROM | RAM | ROM | RAM | ROM | RAM | ROM | RAM | ROM |
| I RAM Change One Set of ROMs | 1 | A′ | 2 | A′ | 3 | A′ | 4 | A′ | 5 | A′ |
| | 2 | B′ | 3 | B′ | 4 | B′ | 5 | B′ | 6 | B′ |
| | 3 | C′ | 4 | C′ | 5 | C′ | 6 | C′ | 7 | C′ |
| | 4 | D′ | 5 | D′ | 6 | D′ | 7 | D′ | 8 | D′ |
| II RAM Non-change Four Sets of ROMs | 1 | A′ | 5 | D′ | 5 | C′ | 5 | B′ | 5 | A′ |
| | 2 | B′ | 2 | A′ | 6 | D′ | 6 | C′ | 6 | B′ |
| | 3 | C′ | 3 | B′ | 3 | A′ | 7 | D′ | 7 | C′ |
| | 4 | D′ | 4 | C′ | 4 | B′ | 4 | A′ | 8 | D′ |

FIG_16

FIG. 18
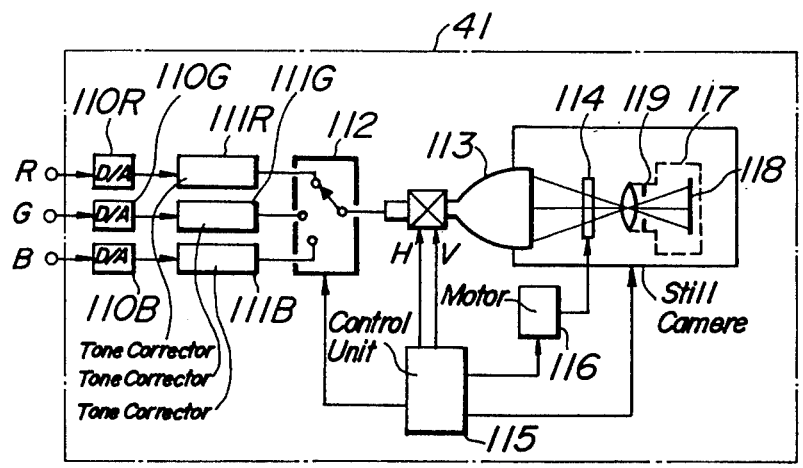
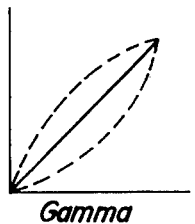
FIG. 19A
Gamma
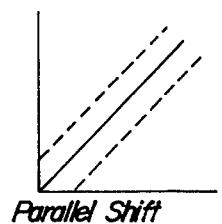
FIG. 19B
Parallel Shift
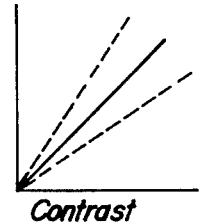
FIG. 19C
Contrast
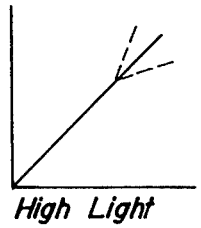
FIG. 19D
High Light
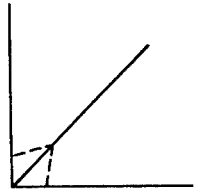
FIG. 19E
Shadow

FIG.31

| | | | | | | |
|---|---|---|---|---|---|---|
| | | x00 | α11 | α12 | α13 | α14 |
| | | x10 | α11 | α12 | α13 | α14 |
| | | x20 | α11 | α12 | α13 | α14 |
| X1 | | x30 | α11 | α12 | α13 | α14 |
| | | x40 | | | | |
| | | ⋮ | | | | |
| | | x630 | α11 | α12 | α13 | α14 |
| | | x00 | α41 | α42 | α43 | α44 |
| | | x10 | | | | |
| X2 | | ⋮ | | | | |
| | | x630 | α41 | α42 | α43 | α44 |
| | | x00 | α31 | α32 | α33 | α34 |
| X3 | | x10 | α31 | α32 | α33 | α34 |
| | | ⋮ | | | | |
| | | x630 | α31 | α32 | α33 | α34 |
| | | x00 | α21 | α22 | α23 | α24 |
| | | x10 | α21 | α22 | α23 | α24 |
| X4 | | ⋮ | | | | |
| | | x630 | α21 | α22 | α23 | α24 |

VIDEO PRINTING APPARATUS

BACKGROUND OF THE INVENTION

The present invention relates to a video printing apparatus for forming from a color video signal color separation films and a color film which serves as a color original for forming color separation films.

Due to a remarkable development in the modern video technique and variety of printed matters, it has been desired to develop a video printing system for printing a color image of a video signal. For this purpose, it is necessary to produce color separation films or a color film by extracting a color video signal of a desired frame from the video signal supplied from a video signal source such as a video tape player, a video disc player, a broadcasting color television signal, and a color television camera. By means of such a video printing system, it is possible to remove wholly or at least partially various problems in process speed, shutter chance, shutter noise, flash lighting and low brightness which have been encountered in the known film producing method using still cameras. Further, the above video printing system can also provide novel and useful development in the printing technology. For instance, it will be possible to produce the printing color films and color separation film directly from video information recorded on video tapes and movie films. This results in that various printed matters will be able to be published in a very simple, inexpensive and prompt manner.

In a known video printing system, in case of producing color separation films from a video tape, the video tape is first set to a video tape player and images are displayed on a monitor screen in a stop or slow reproduction mode. An operator watches the monitor screen and takes a photograph of a desired image or frame with the aid of a still camera. Then, a photographic film is developed to form a color film serving as an original for printing. After that, the original color film is set in a color scanner and four color separation films of cyan, magenta, yellow and black are formed. In such a known system, a resolution of the color film is restricted by a resolution of the image displayed on the monitor screen. In NTSC color television broadcasting system, one frame image is consisted of 525 scanning lines in regardless to a size of the image. Therefore, the resolution of the displayed image is inferior to usual color films and thus, when a photograph of the displayed image is taken by the still camera, the scanning lines are clearly recorded on the film as transverse lines. These lines might cause Moiré fringes in a printed image. Therefore, it is necessary to remove the image of the scanning lines. To this end it has been proposed to expose a few frames of the continuous image reproduced in the slow mode onto a single photographic film and to make an objective lens of the still camera to be slightly out of focus. However, by means of such measures, it is impossible to obtain a photograph of a desired single frame having a sharp image. Further, in case of taking a photograph of a desired single frame of a series of images of an object moving rapidly, it is necessary to reproduce the relevant frame in the stop reproduction mode. In usual ¾" VTR, only the image signal of a single field is reproduced in the stop mode and thus, a vertical resolution of the displayed image is reduced by two times. Therefore, it will be further difficult to remove the spaces between successive scanning lines. In view of the problems mentioned above, in the known system, a size of the image displayed on the monitor screen has to be reduced to such an extent that the scanning lines are no more distinguished and the thus reduced image is recorded by the still camera on a very small film. In such a system, the quality of the recorded image becomes too low to form a large size print more than A6 or A7 size. Further, it is difficult or inconvenient to treat such small size color films in page layout, edition, etc.

In an image processing field, it has been known to increase the resolution of images by effecting an interpolation. This technique may be advantageously applied to the above explained video printing system. In case of effecting the interpolation, the image signal of an extracted frame is once stored in a frame memory and the interpolation is carried out, while given contents stored in the frame memory are selectively read out. In this case, in order to perform any high grade interpolation, it is usual to use an electronic computer, because complicated calculation must be effected. Then a time necessary for effecting the calculation is liable to be long very much and successive signals of picture elements, i.e. pixel signals can only be obtained with a very long time interval. Usually, the operation speed of the color scanner for producing the color separation films is rather slow and four color separation films can be simultaneously formed within about forty to one hundred seconds. Therefore, if the number of interpolated pixels of the frame is about one and a half millions, there is about 27 to 67 micro seconds for obtaining the interpolation pixel. This interpolation time is rather long and use may be made of the computer, if any. Contrary to this, in a color photographing device for producing the color film, use is generally made of a cathode ray tube for displaying the image to be photographed. In the cathode ray tube, in order to keep a deflection distortion within an admissible value, a scanning speed could not be made slower than a certain limit. That is to say, the scanning speed of the cathode ray tube could not be made such a slow speed as forty to a hundred seconds per frame. In practice, it is quite difficult to solve the above mentioned two contradictory problems. Under such circumstances, in a known video printing system use is made of the simplest interpolation such as deriving an average between adjacent scanning lines as disclosed in UK Patent Application Laid-Open Publication No. 2,054,315 published on Feb. 11, 1981. In such a system, the number of scanning lines is increased only by two times and thus, the scanning lines are still perceptible. This results is that in the known system the spaces between successive scanning lines must be removed by deforming a cross section of a light spot on the cathode ray tube into an elongated circle in a direction perpendicular to the scanning line. Then, the image displayed on the cathode ray tube is also blurred and has only a lower image quality.

In order to avoid the above mentioned drawbacks of the known video printing system, one may consider to provide another frame memory after an interpolation stage. In this case, since this additional frame memory must store a very large number of picture element signals obtained after the interpolation, it must be of a very large capacity. Therefore, the whole system becomes large in size, complicated in construction and expensive in cost to a great extent.

SUMMARY OF THE INVENTION

The present invention has for its object to provide a novel and useful video printing apparatus which can overcome the above mentioned drawbacks and can produce a color separation films and color original films from a color video signal.

It is another object of the invention to provide a video printing apparatus for producing color separation films and color films having a higher resolution for use in printing from a color video signal supplied by various kinds of video sources.

It is still another oject of the invention to provide a video printing apparatus which has a much simpler construction.

It is still another object of the invention to provide a video printing apparatus which can perform a high grade interpolation for improving an image quality.

It is still another object of the invention to provide a video printing apparatus which can select a desired interpolation among a plurality of interpolation functions in accordance with an image to be corrected.

According to the invention, a video printing apparatus for forming from a color video signal, color separation films and/or a color film for use in a color printing comprises means for extracting a video signal of a desired frame in the input color video signal;

frame memory means for storing pixel signals of the video signal of the extracted frame;

means for reading out the pixel signals of video signal stored in said frame memory means;

means for effecting an interpolation in accordance with the read out pixel signals to produce interpolated pixel signals;

color photography means including a flying spot scanner tube for displaying black and white images of the interpolated pixel signals at a first scanning speed and means for projecting the images displayed on the flying spot scanner tube onto a color photographic film by means of color filters to form the color film;

color scanner means for receiving the interpolated pixel signals to form the color separation films at a second scanning speed; and means for controlling said reading out means in such a manner that when the color film is formed, the pixel signals stored in the frame memory means are read out at a first timing related to said first scanning speed, and when the color separation films are formed, the pixel signals are read out of the frame memory means at a second timing related to said second scanning speed.

BRIEF DESCRIPTION OF THE DRAWINGS

FIGS. 12A, 12B and 12C are diagrams illustrating the manner of effecting the interpolation in accordance with the cubic convolution method;

FIG. 18 is a schematic view showing an embodiment of the color film photography unit according to the invention;

FIGS. 19A to 19E are graphs showing tone correction characteristics to be effected in the photography unit;

FIG. 31 is a diagram showing a construction of a ROM in the interpolator;

DESCRIPTION OF THE PREFERRED EMBODIMENTS

Figure 1:
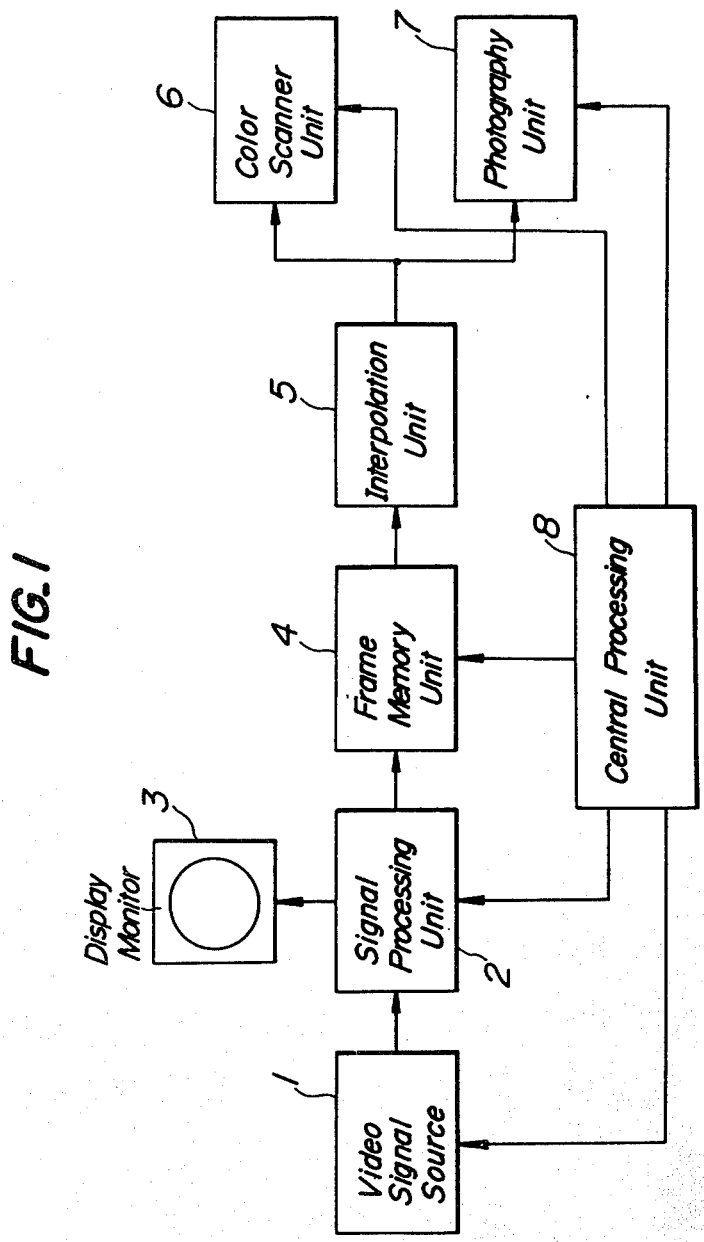
FIG. 1 is a block diagram showing a principal construction of the video printing apparatus according to the invention.

FIG. 1 is a block diagram showing a principal construction of the video printing apparatus according to the invention. A reference numeral 1 denotes a video signal source such as a video tape player, a video disc player, a color television camera for picking up color images recorded on films, slides, telops and color opaques and a color television receiver. A video signal supplied from the video signal source 1 is first processed by a signal processing unit 2 in which one or more desired frames are selected, while the video signal is monitored with the aid of a display monitor 3. In the signal processing unit 2, the video signal of the selected frame is further processed to correct various defects in the video signal such as time base error, noise and lack of details. Then the corrected video signal of the frame is supplied to a frame memory unit 4 and is stored therein, in the form of a number of picture element signals, i.e. pixel signals. Next, the pixel signals stored in the frame memory unit 4 are read out at a predetermined rate and the read out pixel signals are supplied to an interpolation unit 5 in which new pixel signals situating between successive scanning lines are formed by effecting a given interpolation. According to the invention, the interpolation unit 5 is constructed by a hard logic circuit which can perform a rather complicated interpolation for a short time such as 1.5 micro seconds.

Then, the interpolated pixel signals are successively supplied to a color scanner unit 6 and a photography unit 7. The color scanner unit 6 may be a conventional color scanner which produces four color separation films for use in making press plates. The photography unit 7 produces a color film which serves as a color original for making the color separation films later on. The video signal source 1, signal processing unit 2, frame memory unit 4, color scanner unit 6 and photography unit 7 are all controlled by a central processing unit 8. According to one aspect of the present invention, the frame memory unit 4 is so controlled by the central processing unit 8 that the pixel signals are read out of the frame memory unit 4 in synchronism with operation speeds of the color scanner unit 6 and the photography unit 7. Therefore, it is not necessary at all to provide an additional frame memory unit between the interpolation unit 5 and the color scanner unit 6 and photography unit 7. Usually the operation speed, i.e. a scanning speed of the color scanning unit 6 is rather slow and therefore, the operation speed of the interpolation unit 5 would not be restricted by the scanning speed of the color scanner unit 6. Contrary to this, the operation speed of the photography unit 7 could not be made smaller than a certain speed. According to the invention, in view of such a fact, the interpolation unit 5 is constructed by the hard logic circuit whose operating speed is compatible with the scanning speed of the photography unit 7. This is to say, in a preferred embodiment, use is made of the photography unit 7 having the scanning speed of 2.25 seconds/frame and about one and a half million picture elements are interpolated by the interpolation unit 5. Then, the interpolation unit 5 must have the operating speed of about 1.5 micro seconds per picture element. The interpolation unit 5 having such an operating speed can be realized by the relatively simple hard logic circuit. Moreover, such an interpolating unit can perform a high grade interpolation such as cubic convolution method, a bilinear method, and a nearest neighbor method. In a preferred embodiment, the cubic convolution method is adopted and the number of effective scanning lines of 484 lines per frame of usual NTSC color television signal can be increased by four times, i.e. to 1,924 lines. Then, there is no more produced undesired spaces between successive scanning lines and the quality of the image constructed by the interpolated pixel signal becomes sufficiently high for the color printing.

Figure 2:
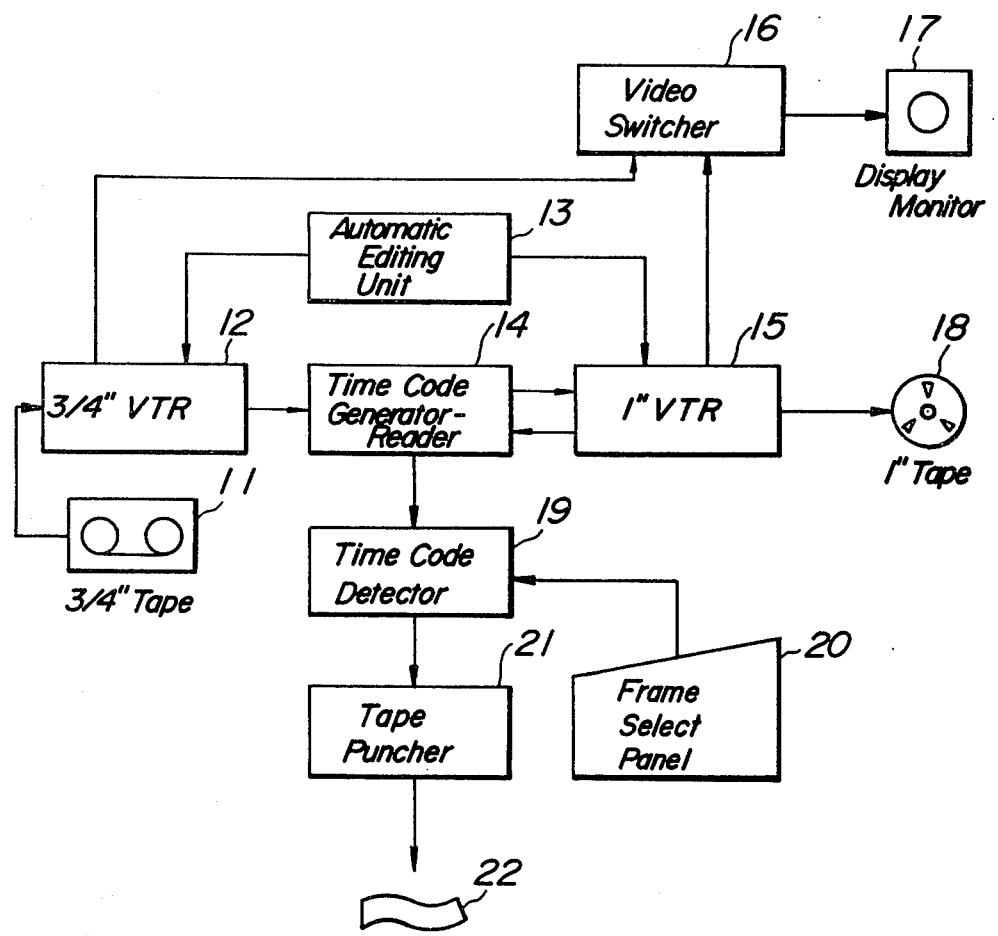
FIGS. 2 and 3 are block diagrams illustrating an embodiment of the video printing apparatus according to the invention.
Figure 3:
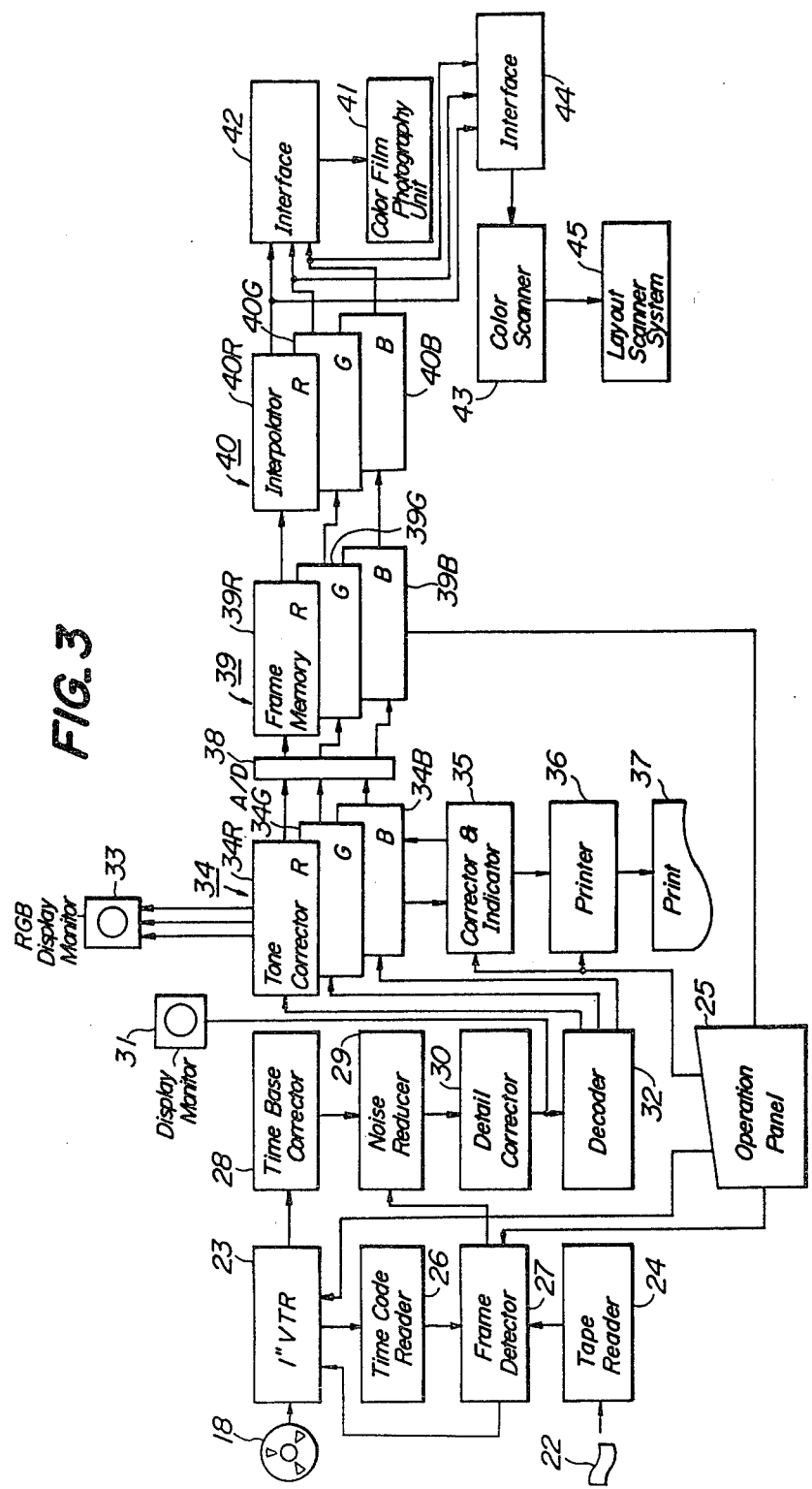

FIGS. 2 and 3 are block diagrams showing an embodiment of the video printing apparatus according to the invention.

FIG. 2 is a block diagram illustrating an embodiment of a video tape editing unit. Nowadays, there are widely used u-matic video cassette tape of ¾ inch width. Therefore, also in the video printing apparatus, the ¾" video cassette tape is generally used as a video signal source by a customer. Therefore, it will be possible to load the ¾" video cassette tape in the ¾" video tape player and desired frames to be printed later may be selected by selectively actuating a slow mode button and a stop mode button of an automatic electronic edition unit, while images displayed on a monitor screen are watched. However, in practice, it is rather difficult to seek a desired one frame from a number of continuous images. Particularly, in order to index a particular frame showing a decisive moment or scene, the slow and stop mode buttons must be actuated repeatedly and then, the original video tape might be injured. Further, the video tape player might be also out of order or broken.

In order to obviate the aforementioned drawbacks, in the present embodiment, a ¾ inch video cassette tape 11 is loaded in a ¾ inch video tape player 12 and a video signal recorded on the tape 11 is supplied via a time code generator-reader 14 to a 1 inch helical scan type video tape recorder 15 and is recorded on a video tape 18 of one inch width. The video tape 18 includes a time code track for recording a time code as well as a video track for recording a video signal and an audio track for recording an audio signal. While the video signal is re-recorded on the 1" video tape 18, the time code generated from the time code generator-reader 14 is also recorded on the time code track in such a manner that each time codes are related to respective frames and any desired frame to be used for printing can be extracted with the aid of the recorded time code in an accurate and prompt manner. During the re-recording the ¾" video tape player 12 and 1" video tape recorder 15 are controlled by an automatic electronic editing unit 13 and the re-recorded video signal may be monitored on a display monitor 17 via a video switcher 16. Therefore, if it is not necessary to re-record all the video signal recorded on the ¾" video cassette tape 11, it is also possible to re-record only necessary portions of the video signal.

After the re-recording or dubbing process has been finished, the 1 inch video tape 18 is rewound on the 1" helical scan type video tape recorder 15 and then is reproduced by suitably operating the slow and stop mode buttons of the editing unit 13, while the reproduced image is monitored with the display monitor 17. Since the display monitor comprises Y/C separation decoder and a cathode ray tube having a high resolution, it is possible to see the images having a higher quality as compared with a usual monitor. While the displayed images are monitored, any desired frames may be selected in accordance with a specification indicating the frames to be printed or at the presence of customers. This may be done by actuating a frame select switch on a frame selection panel 20. Then a time code related to the selected frame is read out by the time code generator-reader 14 and the read out time code is registered in a memory of a time code read out unit 19. After the registration of all necessary frames has been completed, a frame registration end switch on the panel 20 is actuated. Then, the time codes registered in the time code read out unit 19 are successively read out and a punch tape 22 having the time code information recorded thereon is supplied from a tape puncher 22. The above mentioned system control may be performed by a microcomputer.

It should be noted that in the present embodiment, use is made of the 1" helical scan type video tape recorder 15 in order to prevent the video signal from being deteriorated, but if a cost must be reduced or a slight deterioration of the video signal can be afforded, use may be made of the ¾" video tape recorder instead of the 1" video tape recorder. In such a case, since the ¾" video tape recorder instead of the 1" video tape recorder. In such a case, since the ¾" video tape does not have the time code track, the time codes must be recorded on the audio track. Further, the video tape recorder may be replaced by a video disc, and the punch tape 22 may be replaced by any other record medium such as magnetic tape, magnetic disc, floppy disc, etc.

FIG. 3 is a block diagram illustrating an embodiment of a main portion of the video printing apparatus according to the invention. According to the present embodiment, these units are separated from the video editing unit shown in FIG. 2 and thus, the apparatus may be considered to be an off-line system. In this off-line system, the operation for editing the video tape and that for converting and adjusting the video signal can be effected independently from each other, so that operation faculty is enhanced and the apparatus can be utilized in an effective manner without injuring the video tape offered by the customer.

In FIG. 3, the 1" video tape 18 having the video signal dubbed thereon and the punched tape 22 having the time codes relating to the desired frames recorded thereon are set in a 1" helical scan type video tape palyer 23 and a tape reader 24, respectively. Upon operation of a frame extract switch on an operation panel 25, a time code for denoting a previously selected frame is read out of the punch tape 22 into a frame detector 27. At the same time, the video tape recorder 23 is driven into a reproduction mode. Then the time codes previously recorded on the video tape 18 are successively read out by a time code reader 26 and supplied to the frame detector 27. In the detector 27, the successive frame codes are compared with the frame code from the tape reader 24 and when a coincidence is detected between these time codes, a freeze command is sent to a noise reducer 29. Then the video signal of the relevant frame currently supplied through a time base corrector 28 to the noise reducer 29 is stored in a frame memory installed therein. At the same time, the frame detector 27 sends a stop signal to the video tape recorder 23 to stop its reproduction. It should be noted that during the reproduction, the video signal reproduced by the video tape recorder 23 is supplied via the time base corrector 28, the noise reducer 29 and a detail corrector 30 to a display monitor 31 and successive frame images are displayed thereon. The time base corrector 28 and noise reducer 29 constitute a part of an image quality improving section of the signal converting unit. The time base corrector 28 is to correct a time base error in the video signal generally called as a jitter. If the video signal is stored in the frame memory without correcting the jitter, variations and errors might be produced in sampling start points and the number of sampled picture elements for respective scanning lines. The noise reducer 29 is provided to reduce and remove various kinds of noises which have been contained in the video signal to improve the image quality. These noises might be introduced in the video signal recorded on the original ¾" video cassette tape 11 and in the video signal re-recorder on the 1" video tape 18. The detail corrector 30 is provided to enhance abruptly changing portions in the image to form clear contours. The detailed construction and operation of the image quality improving section will be explained later with reference to FIGS. 5, 6, 7 and 8.

The video signal of the selected frame which has been processed by the image quality improving section is then supplied to an R, G, B decoder 32 in which the NTSC video signal is converted in R, G, B signals. The decoder 32 comprises a comb-shaped filter to effect the Y-C separation, so that it is possible to obtain the image signal having excellent resolution and hue. The R, G, B signals thus separated are supplied to an R, G, B display monitor 33 to display a color image of the selected frame. The R, G, B signals are also supplied to respective R, G and B tone correctors 34R, 34G and 34B of a tone corrector 34 which is connected to a corrector and indicator 35 by means of which contrast correction, parallel shift of tone, tone correction in light and shadow portions can be effected manually for the respective color signals. Results of the correction can be inspected on the display monitor 33. Since the display monitor 31 always displays the freezed image, the suitable correction can be easily and accurately performed through the comparison between the two displayed images on the monitors 31 and 33.

By introducing a cursor signal for the video signal provided in the corrector and indicator 35, it is possible to detect a video signal level at any desired point in the displayed image as a comparison value with respect to a video white level standard value of 0.7 volts. The detected video signal levels are displayed on the indicator 35. Further, as a case may be, the detected video signal levels may be printed by a printer 36 to obtain a print 37 having the detected levels printed thereon. It should be further noted that when a color video camera is used instead of the video tape, R, G and B signals derived from the camera may be directly supplied to the tone correctors 34R, 34G and 34B, respectively.

After effecting a given correction by the tone corrector 34, a correction end switch provided on the operation panel 25 is actuated. Then, the corrected R, G and B signals are converted by an A/D converter 38 into digital signals in real time at such a rate or sampling frequency that the video signals of each scanning line are divided into 765 pixel signals. These pixel signals are then supplied to a frame memory 39 including R, G and B frame memories 39R, 39G and 39B. In this manner, the R, G, B video sigals of the desired frame are stored in the respective frame memories. It should be noted that if the original video signal can be provided in the form of R, G, B digital signals, then these signals may be directly stored in the frame memories.

The R, G, B signals stored in the frame memories 39R, 39G and 39B are then read out line by line and are supplied to R, G and B interpolators 40R, 40G and 40B, respectively of an interpolator 40. In the frame memories, the odd and even field signals are stored at different address positions and thus, the odd and even field lines are alternately read out. In this manner, the interlace scanning mode is converted into the sequential scanning mode, so that a so-called pairing phenomenon inherent to the interlace scanning mode can be prevented to obtain the high quality image. As is well known in the art, although the number of scanning lines per frame is 525, the effective number of scanning lines is about 484 with taking into account of a vertical blanking period. Therefore, these 484 lines are successively supplied to the interpolators 40R, 40G and 40B in which the number of the lines is increased to 1,924 which is larger than the original line number of about four times. By increasing the number of lines, the spaces between successive scanning lines are removed substantially completely, and the resolution of the image can be improved.

In the present embodiment, each pixel to be interpolated is determined by neighboring picture elements with taking into consideration their contribution to the relevant pixel and any desired one of the nearest neighbor method, bilinear method and cubic convolution method can be selectively utilized by means of a switch. In the nearest neighbor method, data of an adjacent picture element is used as a pixel data to be interpolated and thus it may be preferably applied to a bivalent image. The bilinear method is advantageously applied to half tone image, because a point data to be interpolated is determined based on an assumption that data between adjacent picture elements is changed linearly. The cubic convolution method may be applied to any kind of image, because a point data to be interpolated is determined in accordance with a correlation between neighboring sixteen picture elements.

In case of the cubic convolution, it is necessary to effect sixteen multiplications and additions for each of about one and a half million picture elements of the frame. Therefore, if these calibrations are carried out by means of a software treatment of an electronic computer, it requires a quite long time. According to the invention, the interpolators 40R, 40G and 40B are constituted by hardware logic circuits and the interpolating calculation is effected in real time to supply the interpolated video signal at a high speed which is compatible with operating speeds of subsequent signal processing units as will be explained later.

In the interpolators 40R, 40G and 40B, the R, G and B signals are processed to obtain interpolated R, G and B signals. These interpolated R, G and B signals are supplied to a color film photography unit 41 via an interface 42. In the color film photography unit 41, the R, G and B signals are successively supplied to a black and white flying spot scanner tube having a high resolution to display images which are projected onto a color film through red, green and blue filters successively. That is to say, when a black and white image of the R signal is displayed on the FSS tube, the red filter is inserted between the tube and the color photographic film to record the red image. As the color film, use is made of a 6×7 cm roll film to obtain a frame size of 51×68 mm as a standard size. This frame size is bigger than a convention frame size by about eight times. Moreover, the color image according to the invention is extremely superior to the known color image.

The interpolated R, G and B signals are also supplied to an electronic color scanner 43 via an interface 44. The color scanner 43 may be a conventional one and comprises R, G and B signal amplifiers and a color converter for converting the R, G and B signals into C (cyan), M (magenta), Y (yellow) and BK (black) signals for color printing. Four light sources are driven by these four printing color signals to form simultaneously four color separation films which are wound on a scanning drum which is rotated in synchronism with the read out frequency of the frame memories 39R, 39G and 39B. According to the present embodiment, the frame size of the color separation films may be selected from about 3.2×4.3 cm, 6.4×8.6 cm, 9.7×12.3 cm and 13.8×18.4 cm. Moreover, the C, M, Y and BK signals derived from the color scanner 43 may be further supplied to a layout scanner system 45 to effect an editing function.

According to the invention, in order to make the construction much simpler as well as to make the image quality much higher, the interpolated R, G and B signals are directly supplied to the color film photography unit 41 and color scanner 43, and the interpolators 40R, 40G and 40B are formed by the hard logic circuits which can perform the necessary calculations at a high speed. In the present embodiment, 484 scanning lines of the R, G and B signals are increased to 1,924 lines by means of the interpolators 40R, 40G and 40B. Since each scanning line is consisting of 756 picture elements, the number of interpolated pixels becomes $(484-3) \times 4 \times (756-3) = 1,448,772$ with taking into account of the fact at a periphery of the image no interpolation could not be carried out owing to a lack of original picture elements necessary for calculation. Since the interpolation for each pixel is effected within $1.5\mu$ seconds, all the picture elements constructing the frame of respective colors can be obtained within about 2.25 seconds. Therefore, in the color film photography unit 41, each color image is displayed within 2.25 seconds. It should be noted that the scanning speed of the FSS tube in the photography unit 41 is higher enough to deflect an electron beam stably and thus, it is possible to form a raster having no disc-tortion. Contrary to this, the color scanner 43 has two scanning speeds of 3,000 RPM and 1,200 RPM. For instance, in case of adopting 3,000 RPM, each line is recorded for 1/50 seconds. This 1/50 seconds is long enough to effect the interpolation. In this case, the frame memories 40R, 40G and 40B are read out at such a rate that the whole frame signals are read out within about forty seconds. In case of forming the color film, each of the R, G and B signals is read out within about 2.25 seconds. It should be noted that the above explained values are shown as a preferable example and the present invention is not limited to these values.

Figure 4:
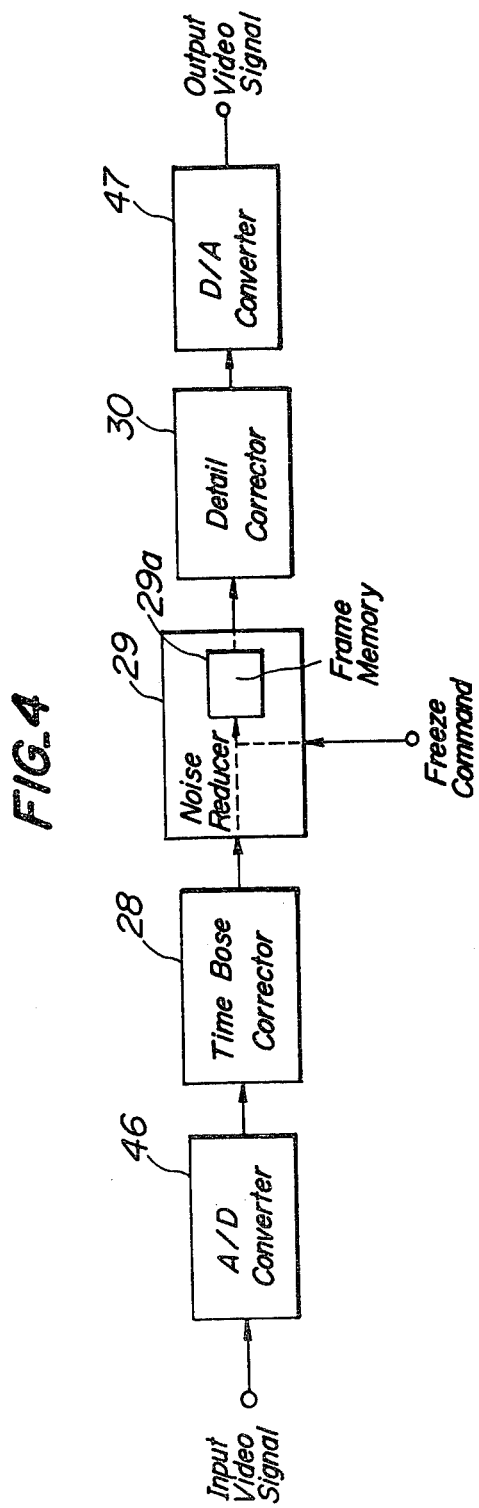
FIG. 4 is a block diagram depicting a detailed construction of a video signal processing unit of the video printing apparatus shown in FIGS. 2 and 3.

Then, a method for improving an image quality in the signal processing unit mentioned above will be explained with reference to the drawings. FIG. 4 is a block diagram showing the signal processing unit 2 according to the invention. The analog video signal is first digitized by an A/D converter 46 and the digital video signal thus obtained is supplied to the digital time base corrector 28, the digital noise reducer 29 and the digital detail corrector 30 in order to improve the image quality. Then the corrected digital video signal is converted into an analog video signal by a D/A converter 47.

Figure 5:
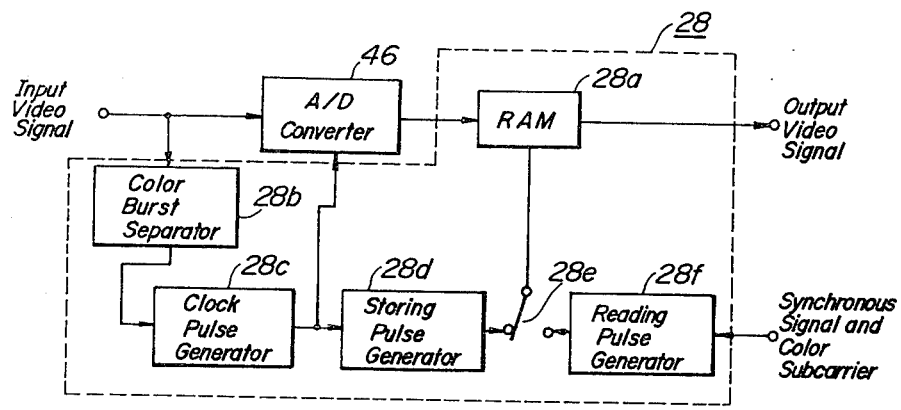
FIG. 5 is a circuit diagram showing an embodiment of a time base corrector.

FIG. 5 is a schematic view showing one embodiment of the digital time base corrector 28 according to the invention. As explained above, the analog video signal is first converted into the digital video signal by the A/D converter 46 and then the digital video signal is stored in a RAM 28a by driving a switch 28e into a storing side as shown in FIG. 5. To this end, a synchronous signal and a color subcarrier signal are extracted from the input video signal by means of a color burst separator 28b and are supplied to a clock pulse generator 28c which produces sampling pulses having a frequency which is higher than the color subcarrier signal synchronized with the synchronous signal. Therefore, though a jitter is remained in the image, it is possible to store the video signal in correct positions in the RAM 28a under the control of a storing pulse generated by a storing pulse generator 28d in synchronism with the clock pulse supplied from the pulse generator 28c. Then, after changing the switch 28e to a reading side, the digital video signals stored in the RAM 28a are read out in synchronism with a reading pulse generated by a reading pulse generator 28f under the control of a synchronous signal generated in the video printing apparatus and a color subcarrier, and thus it is possible to obtain the video signal without jitter. Moreover, the time base corrector of this type compensates a drop out easily by using, for example, a frame correlation. To this end, a second frame memory other than the RAM 28a in FIG. 5 may be arranged so as to store the video signal of one frame prior to the current one, and when the drop out is detected, the current data corresponding to the drop out duration are exchanged with the corresponding data of the prior frame stored in the second frame memory. It should be further noted that the dropped data may be compensated for by utilizing data which are interpolated by various conventional interpolating methods.

Figure 6:
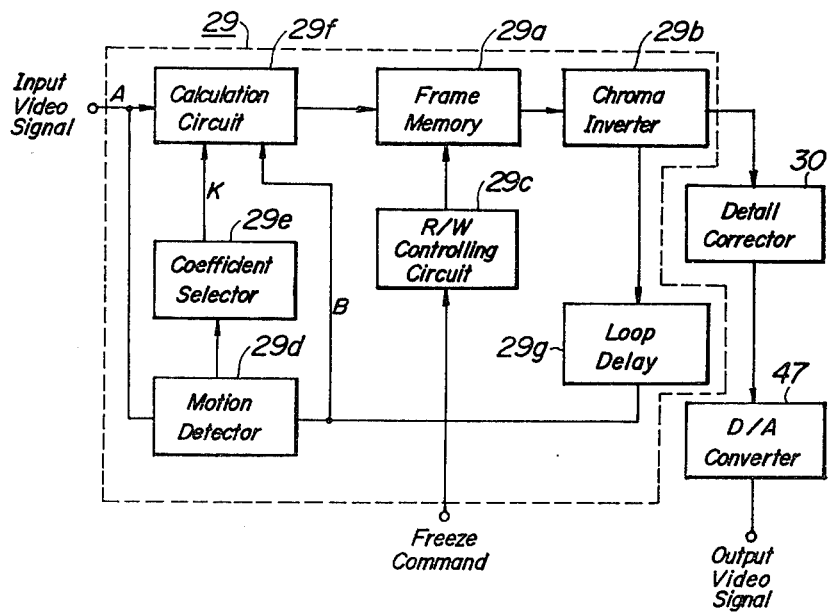
FIG. 6 is a circuit diagram depicting an embodiment of a noise reducer.

FIG. 6 is a block diagram showing one embodiment of the digital noise reducer 29 using a recursive filter according to the invention. An operation of the noise reducer 29 is based on the fact that the video signal has an extremely high autocorrelation characteristic between successive frames, but noise components included in the video signal have not high autocorrelation at all. Correspondingly, since, if the data of successive frames are averaged, an energy of the video signal is not varried at all but that of the noise components is decreased, it is possible to improve an S/N to a great extent.

In FIG. 6, the digital video signal A is, at first, supplied to a calculation circuit 29f. To the calculation circuit 29f, a coefficient K determined by a method mentioned below is supplied from a coefficient selector 29e and a data B corresponding to that of one frame prior stored in the frame memory 29a is also supplied through a chroma inverter 29b and a loop delay 29g, and then a calculation of $(1-K)\cdot A + K\cdot B$ is performed in this calculation circuit 29f. Output signals thus obtained are successively stored in the frame memory 29a so as to be used as the data B in the calculation of a next frame. The chroma inverter 29b is used for adjusting phases of data A and B each other in the calculation circuit 29f, because the chroma signal of the NTSC system is varied by 180° in its phase every one frame. Now, in the noise reducer, there is a problem of an afterimage. In case of applying the noise reduction to a still image or an image having slow movement, no difference is occurred between the image A and the fedback image B in the calculation circuit 29f. Contrary to this, in case of the noise reducer, an image having fast movement, differences might occur between the images A and B and thus, there occurs the afterimage in the video signal. Therefore, in order to eliminate such a drawback of the afterimage, for the slow image S/N ratio is made good by making the coefficient K larger, and for the fast image the input video signal is used as an output signal by making the K zero. A control mentioned above is effected by a motion detector 29d which calculates a difference between the input signal A and the fedback signal B and then detects whether there is the movement or not by estimating a magnitude of $(A-B)$. Accordng to the detection result, the coefficient K is made larger if $(A-B)$ is small and made smaller if $(A-B)$ large by the coefficient selector 29e. Moreover, the loop delay 29g serves to adjust a time difference between A and B which are supplied to the calculation circuit 29f correctly to one frame. In the noise reducer 29 shown in FIG. 6, it is necessary to freeze the image when a video signal of a predetermined frame is stored in the frame memory 29a, and at this time the freeze command is supplied to an R/W controlling circuit 29c so as to freeze the data in the frame memory 29a. In this moment, the data stored in the frame memory 29a are read out just before the freeze command is supplied, and thus a required still image can be obtained. After that, the image thus obtained is supplied to the detail corrector 30 so as to enhance the contours of the image and is converted into the analog video signal by the D/A converter 47.

Figure 7:
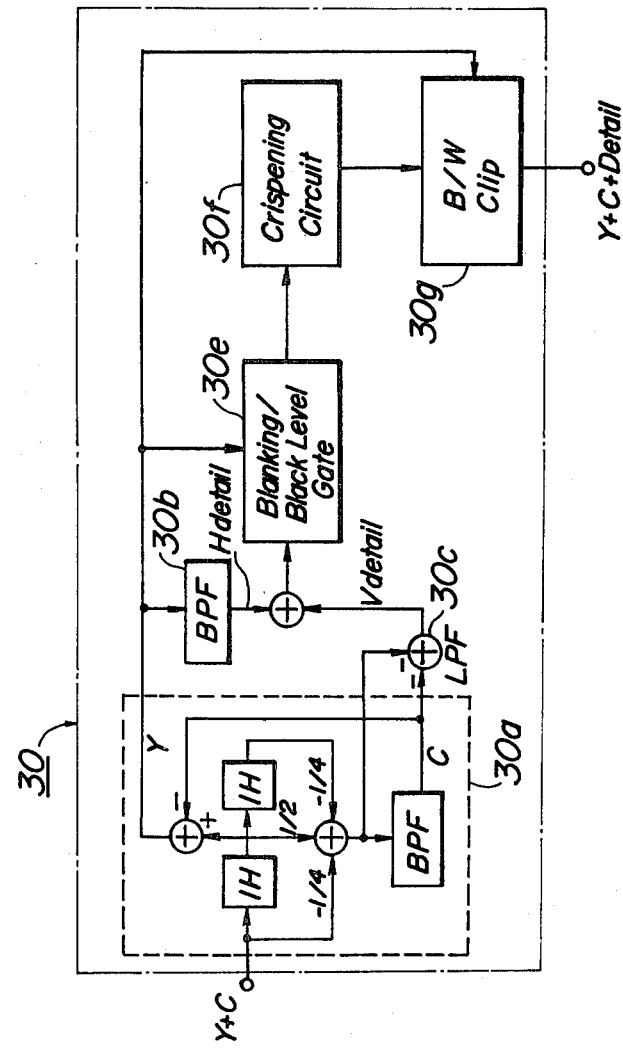
FIG. 7 is a circuit diagram illustrating an embodiment of a detail corrector.

FIG. 7 is a block diagram showing one embodiment of the digital detail corrector 30 according to the invention. The input video signal including a luminance signal Y and a chroma signal C is separated into Y and C by a comb filter 30a comprising 1H delays, adders and a band pass filter. As for the comb filter, various circuits have been known, but in this embodiment a 2H type comb filter having good Y-C separability is used. A detail signal of horizontal direction (H detail signal) is obtained from the separated Y signal through a band pass filer 30b. A detail signal of vertical direction (V detail signal) is obtained from the separated C signal through a low pass filter 30c. The H and V detail signals thus obtained are added by an adder 30d and then a required correction for the video signal is performed by compensation circuits such as a blanking/black level gate 30e, a crispening circuit 30f, and a B/W clip 30g. The detail signal thus obtained is mixed with an original signal by an adder, so that it is possible to obtain the output video signal in which the contours of the image are enhanced. The blanking/black level gate 30e serves to eliminate pulsatory noise generated before and after a retrace period and a detail signal near the black level including much noise by, for example, a gamma correction. The crispening circuit 30f serves to remove only the signal having low level component, and thus the noise can be eliminated. The B/W clip 30g serves to restrict a magnitude of the detail signal near black and white levels, since, near black and white levels of a high contrast image, the detail signal is made large correspondingly and the image becomes unnatural.

Now an embodiment of the tone corrector 34 will be explained in detail with reference to FIGS. 8 and 9A to 9E.

In the known video image photography device using the still camera, in order to improve the image quality and to correct or compensate differences in color temperature, spectrum characteristics and density range between R, G, B fluorescent materials of the color Braun tube and the color film, a special color temperature correcting filter must be provided in front of the still camera and further it is necessary to effect adjustments of hue and contrast of the image displayed on the color monitor. However, in the known apparatus, it is difficult to obtain images having satisfactory color reproduction. Moreover, in the known video instruments only contrast adjustment can be effected for the tone control. However, in the video printing apparatus it is important to effect the tone correction not only wholly, but also partially to control the level and tone of the video signal prior to actual printing.

In the tone corrector 34 of the present embodiment it is possible to effect parallel shift contrast adjustment, middle tone adjustment, high light adjustment, shadow adjustment for R, G and B signals separately or totally, and to detect a video signal level at an arbitrary point in the image as a relative value with respect to the white signal standard value.

Figure 8:
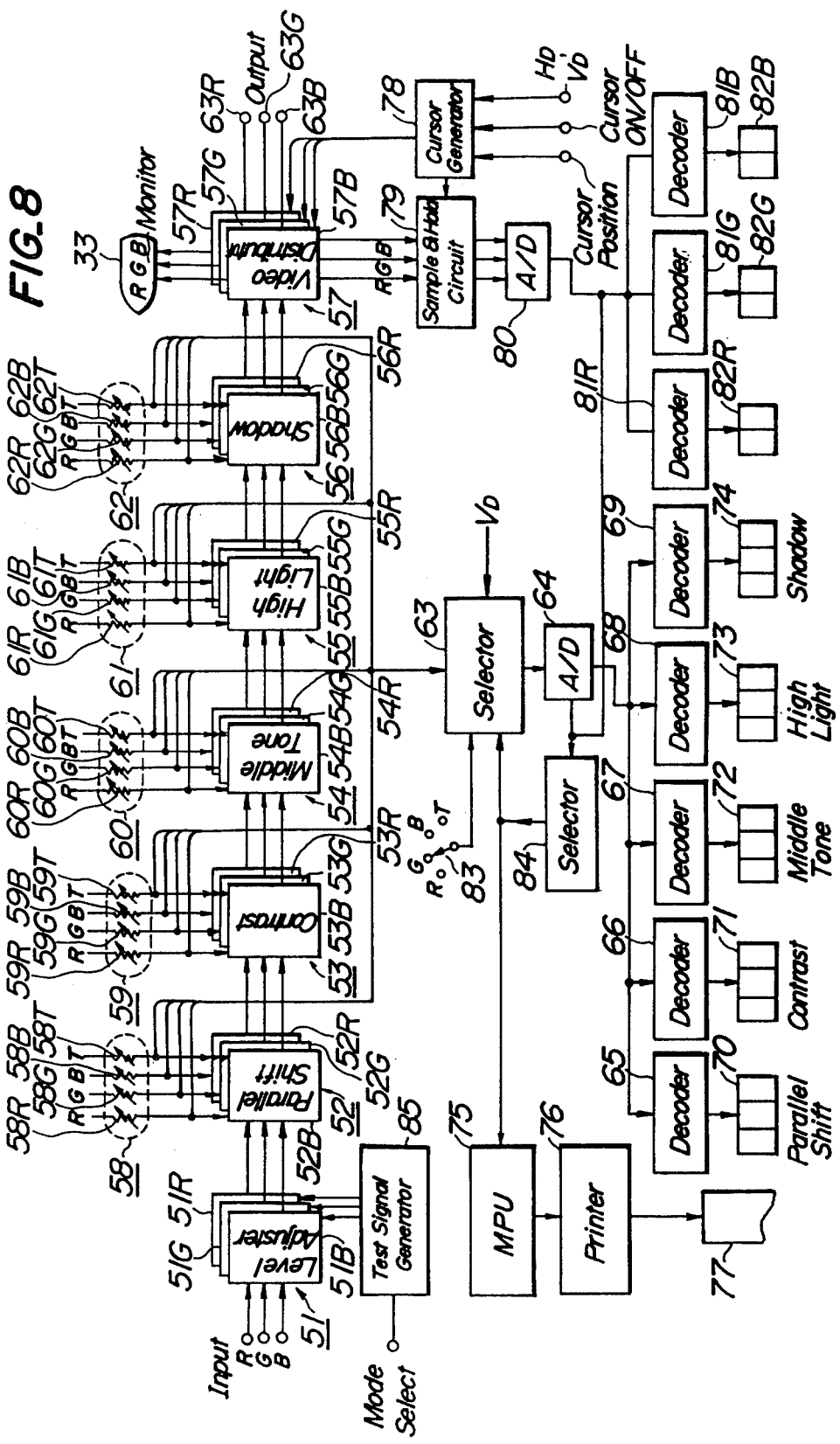
FIG. 8 is a circuit diagram showing an embodiment of a tone corrector.
Figure 9A:
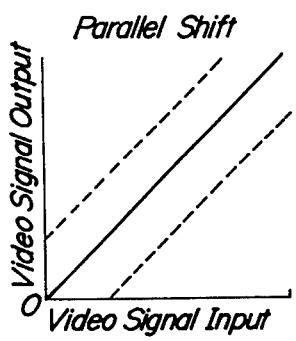
FIGS. 9A to 9E are characteristic curves for explaining an operation of the tone corrector.
Figure 9B:
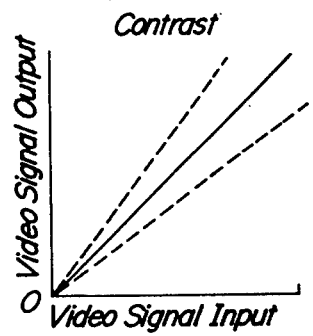
Figure 9C:
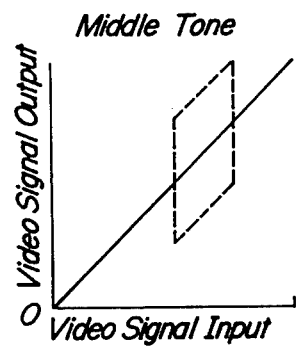
Figure 9D:
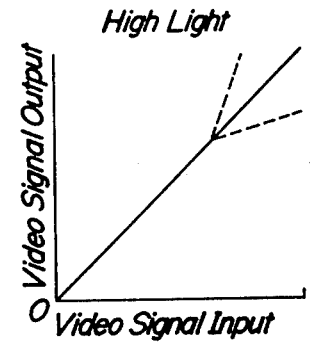
Figure 9E:
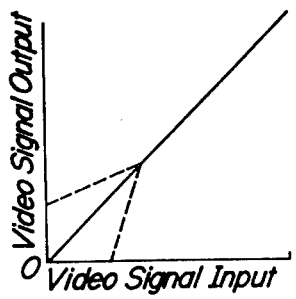

FIG. 8 is a block diagram illustrating an embodiment of the tone corrector 34 according to the invention. As explained before, the color video signal of the extracted frame is once stored in the frame memory in the noise reducer 29 and is converted into the R, G and B signals by the decoder 32. Then the converted R, G and B signals are supplied to level adjusters 51R, 51G and 51B and then are supplied to parallel shift adjusters 52R, 52G, 52B, contrast adjusters 53R, 53G, 53B, middle tone adjusters 54R, 54G, 54B, high light adjusters 55R, 55G, 55B and shadow adjusters 56R, 56G, 56B successively and are adjusted therein. The R, G and B signals thus adjusted are further supplied to the R, G, B display monitor 33 to display the tone adjusted image via video distributors 57R, 57G and 57B. These R, G and B signals are also supplied via output terminals 63R, 63G and 63B to the A/D converter 38 and the corresponding frame memories 39R, 39G and 39B. The parallel shift adjusters comprise R, G and B control volumes 58R, 58G and 58B for adjusting respective color signals independently from each other and a T control volume 58T for adjusting the color signals totally. The remaining adjusters 53, 54, 55 and 56 also comprise R, G, B and T control voluems 59R, 59G, 59B, 59T; 60R, 60G, 60B, 60T; 61R, 61G, 61B, 61T; 62R, 62G, 62B, 62T. Adjusted values of these volumes are supplied via a selector 63, an A/D converter 64 and decoders 65 to 69 to indicators 70 to 74 as numerical values. The selector 63 is driven by a vertical driving signal $V_D$ to display the parallel shift (brightness), contrast, middle tone, high light and shadow adjustments each for 1/12 seconds. Each indicator displays the adjusted value in such a manner that a center value of the volume is indicated at a center value 0 and the largest and smallest value of the volume are indicated at extreme values of $+100$ and $-100$, respectively. These adjusted values are also supplied via an MPU 75 to a printer 76 and are recorded on a print paper 77. Therefore, by adjusting the volumes later in accordance with the data recorded on the print paper 76, it is possible to obtain the same video signals.

The video signal thus controlled is displayed by the display monitor 33 and the operator can control the abovementioned adjustments while looking at the displayed image. In order to display a cursor superimposed on the color image, there is provided a cursor signal generator 78 to which are supplied a cursor ON/OFF signal from a cursor ON/OFF switch, a cursor position signal from a joy-stick and horizontal and vertical synchronizing signals. Then the cursor signal generator 78 supplies a cursor signal including clock pulses, blanking pulses and a cursor position signal which is supplied via the video distributor 57 to the R, G, B display monitor 33 to display the cursor. It should be noted that the video distributors 57 are so constructed that the cursor signal is supplied only to the display monitor 33. By suitably operating the joy-stick it is possible to move the cursor in the displayed image into a desired position.

The video voltage level of the position denoted by the cursor is sampled and held by a sample and hold circuit 79 and then is converted into a digital value by an A/D converter 80. These converted R, G, B values are displayed by indicators 82R, 82G and 82B via decoders 81R, 81G and 81B as percentage values of two digits with respect to the video white signal level. That is to say, the levels of R, G and B signals constituting the white standard signal are represented as 100 and a black level is denoted by 0.

The selector 63 is controlled by a switch 83 for selecting the R, G, B and T volumes. A selector 84 selects the digital values from the A/D converter 64 and the selected values are supplied to the printer 76 under the control of the MPU 75. There is further provided a test signal generator 85 for producing a color bar and a gray scale including twelve tones which are utilized to adjust the tone corrector.

FIGS. 9A to 9E are graphs for explaining the operation of the parallel shift (brightness), contrast, middle tone, high light and shadow adjustments, respectively. In these graphs the video signal input and output are plotted on abscissa and ordinates, respectively. Solid lines denote standard characteristics when the volumes are set at the center values 0 and dotted lines denote adjustable ranges.

As explained above, in the tone corrector 34 of this embodiment, the tone adjustments can be effected accurately and easily, while observing the color image displayed on the monitor 33. Further necessary data for adjustments can be recorded on the print paper, the reconstruction of the same color image can be effected easily and precisely. It should be noted that the adjustments can be recorded on other record medium than the print tape 77.

Next, the interpolator 40 will be explained in detail.

As explained above, the image of the television signal of NTSC system is composed of 525 lines (the number of effective lines is 484) and therefore, if the image is recorded on an A5 size film, the scanning line density becomes 3.2 lines/mm and the spaces between successive scanning lines are clearly susceptible. Contrary to this, ordinary printed matters have a higher density of about 6 to 28 lines/mm. In order to increase the number of lines of the video signal, the interpolation must be carried out. There have been developed various interpolation methods such as the cubic convolution method, bilinear method and nearest neighbor method. Among these methods, it has been said that the cubic convolution method has the highest grade and can perform the best interpolation for all kinds of images. However, it has been confirmed experimentally that the bilinear method and nearest neighbor method can provide better results than the cubic convolution method for some images. For instance, if the image is mainly composed of horizontal and vertical lines, the optimum interpolation can be effected by means of the bilinear method. In view of the above fact, according to the present embodiment there are provided a plurality of interpolating methods and one of them can be selected in accordance with the construction of the image to be interpolated. In the cubic convolution method, neighboring sixteen pixels are used to form an interpolated picture element by deriving a sum of products between the sixteen pixel values and coefficient which represent a correlation of these sixteen pixels. In this embodiment the interlace scanning mode is first converted into a sequential scanning mode and between successive scanning lines there are formed three lines by the interpolation. In this manner, the number of total scanning lines becomes 1,924. Therefore, in case of projecting the interpolated image on a color film, successive scanning lines are partially superimposed on another. That is to say, if the image is recorded on the color film of A5 size, the scanning line density becomes 13 lines/mm which is comparable with ordinary color prints. Further, the resolution of the image is increased by about 1.2 to 1.3 times by means of the interpolation.

Figure 10:
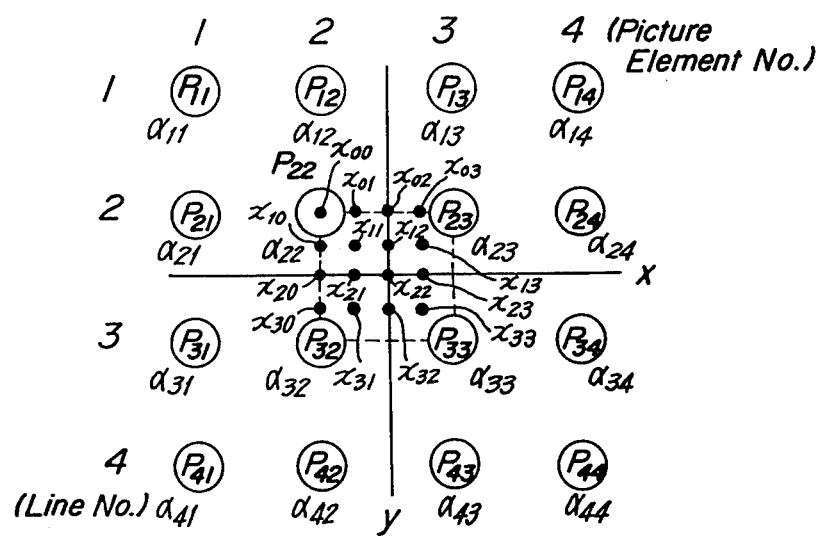
FIG. 10 is a diagram for explaining a correlation between picture elements and a point to be interpolated in a cubic convolution method.

FIG. 10 is a diagrammatic view explaining a correlation between the original pixels and interpolated pixels. As explained before, the original video signal is sampled by the clock pulses having the frequency of 4 fsc. Here, fsc is the color subcarrier frequency and is equal to 3,579,545 Hz. Then one scanning line signal are divided into 756 pixels. According to the sampling theory, the original image can be reconstructed when the image signal is sampled by a sampling frequency which is higher by twice than the highest frequency contained in the image signal. In the NTSC video signal, the highest frequency is lower than 6 MHz whilst 4 fsc is higher than 14 MHz. Therefore, the above sampling theory is satisfied. In case of using video instruments such as RGB cameras having a higher resolution, the highest frequency of image signal becomes more than 10 MHz. Then, the sampling frequency may be increased to 6 fsc (21.48 MHz). In this manner, when the image signal is sampled by the clock pulses having the sampling frequency equal to even multiple of fsc, the picture elements $P_{11}$, $P_{12}$ ... are aligned linearly in X and Y directions as illustrated in FIG. 10.

Figure 11:
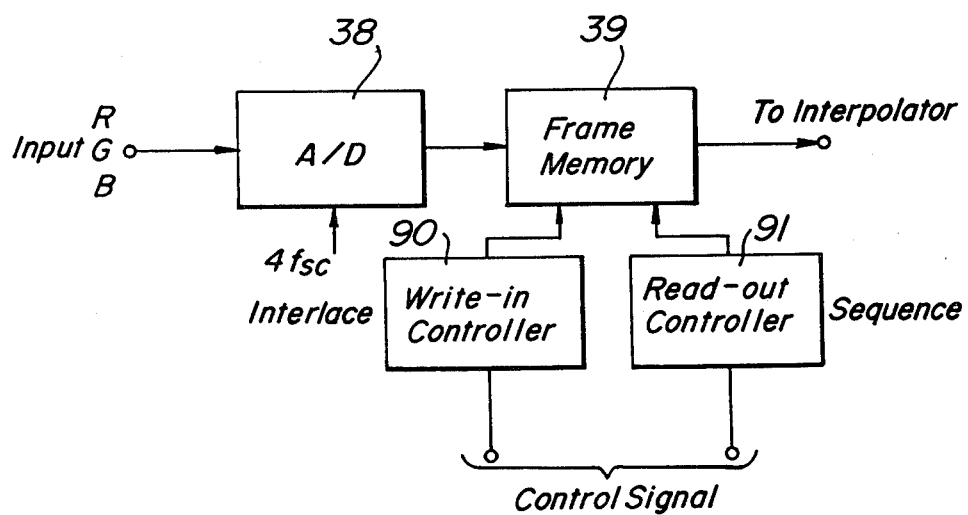
FIG. 11 is a block diagram showing a control circuit for converting the interlace scanning to the sequence scanning.

FIG. 11 is a block diagram showing a control circuit for controlling write-in and read-out operations of the frame memory 39. The input R, G and B signals are sampled by the A/D converter 38 into digital signals and which are then written in the frame memory under the control of a write-in control circuit 90 which operates on the basis of the interlace scanning mode. After the video signal of one frame has been stored in the frame memory 39, the video signal is read out of the memory 39 under the control of a read-out control circuit 91 in such a manner that the scanning field of the odd and even fields are derived alternately to obtain the video signal of the sequential scanning mode. In this manner, the interlace scanning can be converted into the sequential scanning and it is possible to avoid the so-called pairing phenomenon in which spaces between successive scanning lines might not be uniform and a fringe pattern might occur.

As explained above, data of each picture element to be interpolated is a sum of respective products of neighboring sixteen pixel values and pixel coefficients. These pixel coefficients represent correlation between the relevant picture element to be interpolated and the neighboring picture elements. As illustrated in FIG. 10, it is now assumed that points within a hatched area are to be interpolated, x and y axes are main and sub scanning directions, and distances between adjacent picture elements measured in the x and y directions are one unit, i.e. 1. The cubic convolution method may be approximately expressed by the following equations.

$$a_1(x,y) = \{1-2|x|^2+|x|^3\}\{1-2|y|^2+|y|^3\}$$

$$0 \leq |x| < 1, \ 0 \leq |y| < 1 \quad (1)$$

$$a_2(x,y) = \{1-2|x|^2+|x|^3\}\{4-8|y|+5|y|^2-|y|^3\}$$

$$0 \leq |x| < 1, \ 1 \leq |y| < 2 \quad (2)$$

$$a_3(x,y) = \{4-8|x|+5|x|^2+|x|^3\}\{1-2|y|^2+|y|^3\}$$

$$1 \leq |x| < 2, \ 0 \leq |y| < 1 \quad (3)$$

$$a_4(x,y) = \{4-8|x|+5|x|^2-|x|^3\}\{4-8|y|+5|y|^2-|y|^3\}$$

$$1 \leq |x| < 2, \ 1 \leq |y| < 2 \quad (4)$$

$$a_5(x,y) = 0 \ \ 2 \leq |x|, \ 2 \leq |y| \quad (5)$$

The sixteen pixel coefficients $a_{11}$ to $a_{44}$ may be calculated by the above equations and have different values in dependence upon points to be interpolated even if these points situate in the hatched area. The bilinear and nearest neighbor methods may be effected by the same circuitry in accordance with the same process by suitably selecting the coefficient $a_{11}$ to $a_{44}$. If the pixel value and pixel coefficient of respective picture elements are represented by Pij and $a_{ij}$, respectively, a value P of a picture element to be interpolated may be obtained as follows.

$$P = \sum_{i=1}^{4} \sum_{j=1}^{4} a_{ij} \cdot P_{ij} \quad (6)$$

In general, the value of the picture element to be interpolated may be derived by the equation (6) using neighboring sixteen picture elements. When points to be interpolated situate just on the picture element array, i.e. points $x_{00}$, $x_{10}$, $x_{20}$, $x_{30}$ in FIG. 10, the coefficients for the picture elements on neighboring picture element arrays are all equal to zero. Therefore, an amount of calculation become a fourth. In the present embodiment, the interpolator comprises a circuitry for calculating the sixteen products for respective picture elements in order to supply all the picture element data in the form of digital values to a special output device. However, in practice, it is sufficient to effect the interpolation only for a single picture element array on which pixels to be interpolated situate.

In the present embodiment, there are produced three scanning lines within the space between successive lines and thus the number of the scanning lines is increased by four times. Among four scanning lines one scanning line situates on the original scanning line, but its data is also derived by the calculation and thus is treated in the entirely same manner as other interpolated scanning lines. It should be noted that according to the present invention the number of the scanning lines may be increased by any other numbers than four times such as two, three, five or six times. In any case, the pixel coefficients have been previously calculated in accordance with the equations (1) to (5) and stored in ROMs. These stored values are repeatedly used to effect the interpolation. That is to say, the picture element data read out of the frame memory 39 is sent to an interpolator 40 and is stored in RAMs thereof. Then the data read out of the RAMs is supplied to a calculation circuit together with the pixel coefficients read out of the ROMs. At first, the upper four scanning lines data is stored in the four RAMs and pixel values $x_{00}$, $x_{10}$, $x_{20}$, $x_{30}$ are calculated. Then the interpolation area is shifted rightward by one pitch and four pixel values $x'_{00}$, $x'_{10}$, $x'_{20}$, $x'_{30}$ in this area are calculated. In this manner, four pixel values in respective areas are successively calculated. Then the first scanning line data $P_{11}$, $P_{12}$, ... are erased from the first RAM and a fifth scanning line data are stored in the first RAM. Then pixel values $x_{01}$, $X_{11}$, $x_{21}$, $x_{31}$ are calculated and the above explained calculation is carried out successively. In this manner, the given interpolation is effected over the whole frame.

FIGS. 12A to 12C are diagrams for explaining a combination of the RAMs for storing the original pixel values and ROMs for storing the pixel coefficients. Now it is assumed that a point $X_1$ shown in FIG. 12A is to be interpolated. Then, the first to fourth scanning line data $P_{11}$ to $P_{14}$; $P_{21}$ to $P_{24}$; $P_{31}$ to $P_{34}$, $P_{41}$ to $P_{44}$ are stored in RAM-1 to RAM-4, respectively. The pixel coefficients $\alpha_{11}$ to $\alpha_{14}$; $\alpha_{21}$ to $\alpha_{24}$; $\alpha_{31}$ to $\alpha_{34}$; $\alpha_{41}$ to $\alpha_{44}$ have been previously stored in ROM-1 to ROM-4, respectively as illustrated in FIG. 12B. Then, sixteen products of corresponding picture element data and pixel coefficients are calculated and a sum of these products is derived to obtain an interpolated data at the point $X_1$. In order to interpolate a point $X_2$, the second to fifth scanning line data $P_{21}$–$P_{24}$, $P_{31}$–$P_{34}$, $P_{41}$–$P_{44}$, $P_{51}$–$P_{54}$ are stored in the RAMs and the second, third, fourth and fifth scanning line pixel values are multiplied by the pixel coefficients in the ROM-1 to ROM-4, respectively. In this case there are two combinations of the RAMs and ROMs. In a first method, there is provided only one set of the ROM-1 to ROM-4 storing the coefficients A' and D' as illustrated in first column I in FIG. 12C and the scanning line data is stored in the RAM-1 to RAM-4 in such a manner that new line data is always stored in the last RAM-4. In the second method shown in a column II in FIG. 12C, there are provided four sets of ROMs in which the coefficients A' to D' are stored in different orders and new line data is successively stored in different RAMs. That is to say, in case of interpolating the point $X_2$, the fifth line data 5 is stored in the first RAM-1, and in case of calculating a next point $X_3$, a sixth line data is stored in the second RAM-2 and so on. In either methods, in case of interpolating a fifth point $X_5$, the scanning line pixel data are stored in the RAM-1 to RAM-4 orderly and the ROM-1 to ROM-4 store the same coefficients as those for the first point $X_1$. That is to say, the same condition appears every four scanning lines. In the first method, it is sufficient to provide only one set of ROM-1 to ROM-4, but the contents in the RAMs must be transferred for the successive points $X_1$, $X_2$.... This will require four eigth-bit selectors. Contrary to this, in the second method there must be provided four sets of ROMs, but it is not necessary to exchange the contents of the RAMs. Therefore, the process time may be shortened.

As explained above, the interpolation must be effected at a high speed in order to make the deflection of the cathode ray tube in the color film photography unit 41 as stable as possible. For this purpose, the calculation of the interpolation must be effected within about $1.5\mu$ seconds. In case of effecting the interpolation by means of a soft program of computer, such as high speed calculation could not be performed. For instance, an access time for a MOS RAM will take about 150 to 200 nseconds and thus about 2.4 to $3.2\mu$ seconds is required to read out the sixteen data. This time is too long to operate the cathode ray tube stably. Therefore, in the present invention, the calculation is effected by the hard logic circuits. Further, in the present embodiment, four hard logic circuits are provided parallelly and calculations are effected in a short time such as $1.5\mu$ seconds for respective pixels.

Figure 13:
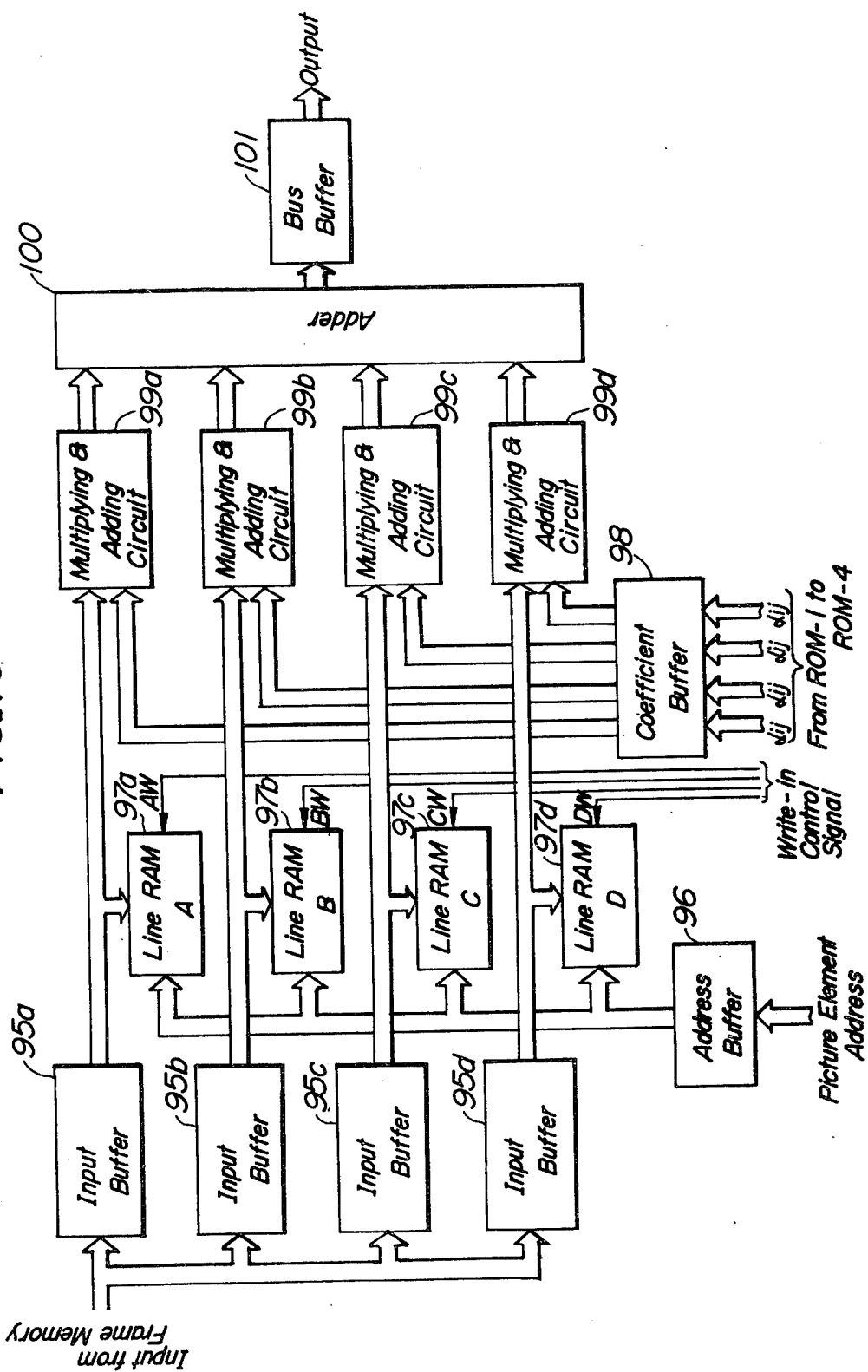
FIG. 13 is a block diagram depicting an embodiment of the interpolator according to the invention.

FIG. 13 is a block diagram showing an embodiment of the interpolator 40 according to the invention. As explained above, the interpolator comprises four channels which operate parallelly. The four scanning line values read out of the frame memory 39 are parallelly supplied to four input buffers 95a to 95d, respectively and are stored therein. This storing operation is effected under the control of write-in control signals AW, BW CW and DW. Then the signals stored in the input buffers are read out and stored in line RAMs 97a to 97d under the control of address signals supplied via an address buffer 96 to the line RAMs 97a to 97d. Next, the scanning line signals stored in the line RAMs 97a to 97d are supplied to multiplying and adding circuits 99a to 99d to which are also supplied the pixel coefficients via a coefficient buffer 98 from the coefficient ROM-1 to ROM-4 not shown in FIG. 13. In each multiplying and adding circuits 99a to 99d, the corresponding four coefficients are multiplied to produce four products and then these products are added to each other. Then the four sums of four products are supplied to an adder 100 to produce a total sum of the four sums as an interpolated data. The interpolated data is supplied to an output terminal via a bus buffer 101. In the present embodiment, the second method shown in the second column in FIG. 12C is used.

Figure 14A:
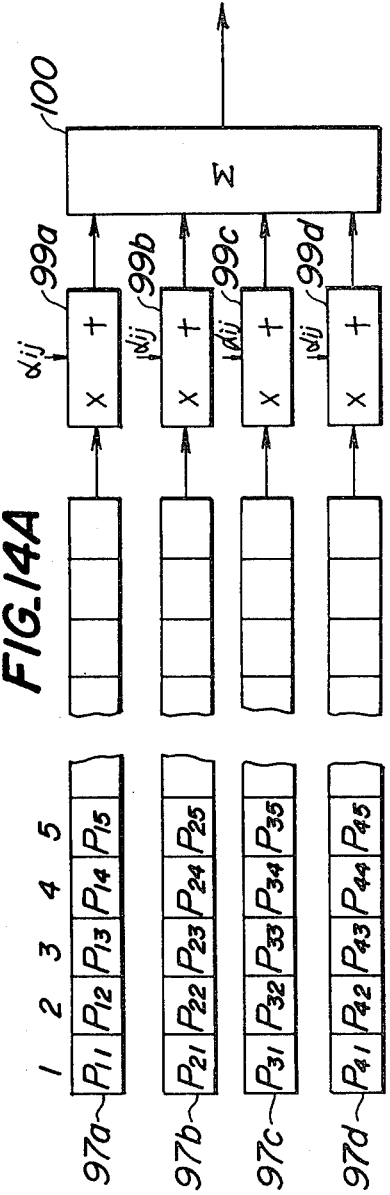
FIGS. 14A and 14B are diagrams for explaining the interpolation for a single picture element.
Figure 14B:
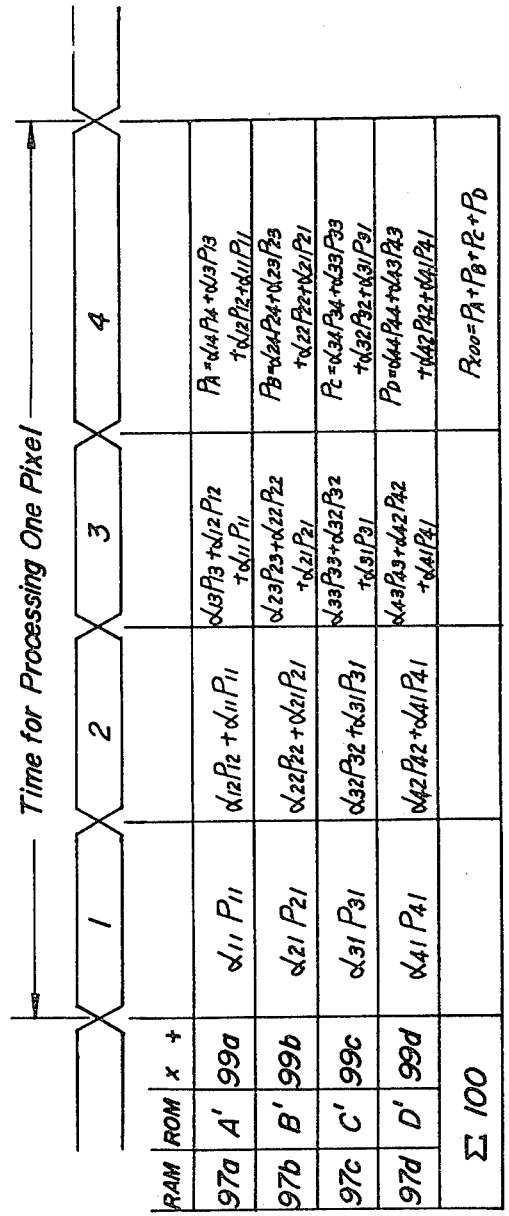

As illustrated in FIGS. 10A, 14A and 14B, when the left upper corner point $x_{00}$ is interpolated, picture signals $P_{11}$, $P_{21}$, $P_{31}$ and $P_{41}$ are supplied from the line RAMs 97a to 97d, respectively to the multiplying and adding circuits 99a to 99d, respectively. At the same time, the pixel coefficients $\alpha_{11}$, $\alpha_{21}$, $\alpha_{31}$ and $\alpha_{41}$ are also supplied to the circuits 99a to 99d, respectively. Then products $\alpha_{11} \times P_{11}$, $\alpha_{21} \times P_{21}$, $\alpha_{31} \times P_{31}$ and $\alpha_{41} \times P_{41}$ are calculated and stored in the circuits 99a to 99d. In a next step, the pixel signals $P_{12}$, $P_{22}$, $P_{32}$ and $P_{42}$ are supplied to the circuits 99a to 99d from the RAMs 97a to 97d, respectively. At the same time, the pixel coefficients $\alpha_{12}$, $\alpha_{22}$, $\alpha_{32}$ and $\alpha_{42}$ are supplied to the circuits 99a to 99d, respectively. Then products $\alpha_{12} \times P_{12}$, $\alpha_{22} \times P_{22}$, $\alpha_{32} \times P_{32}$ and $\alpha_{42} \times P_{42}$ are calculated and further these products are summed up with the previous products $\alpha_{11} \times P_{11}$, $\alpha_{21} \times P_{21}$, $\alpha_{31} \times P_{31}$ and $\alpha_{41} \times P_{41}$, respectively. That is to say sums $\alpha_{12}P_{12} + \alpha_{11}P_{11}, \ldots, \alpha_{32}P_{32} + \alpha_{31}P_{31}$ and $\alpha_{42}P_{42} + \alpha_{41}P_{41}$ are stored in the circuits 99a to 99d, respectively. The above calculations are carried out by further two steps to derive the following sums.

$$P_A = \alpha_{14} \times P_{14} + \alpha_{13} \times P_{13} + \alpha_{12} \times P_{12} + \alpha_{11} \times P_{11}$$

$$P_B = \alpha_{24} \times P_{24} + \alpha_{23} \times P_{23} + \alpha_{22} \times P_{22} + \alpha_{21} \times P_{21}$$

$$P_C = \alpha_{34} \times P_{34} + \alpha_{33} \times P_{33} + \alpha_{32} \times P_{32} + \alpha_{31} \times P_{31}$$

$$P_D = \alpha_{44} \times P_{44} + \alpha_{43} \times P_{43} + \alpha_{42} \times P_{42} + \alpha_{41} \times P_{41}$$

These sums are stored in the circuits 99a to 99d, respectively. Then the sums are sent to the adder 100 to produce the total sum $P_{x_{00}} = P_A + P_B + P_C + P_D$. This total sum $Px_{00}$ is an interpolated pixel signal of the relevant point $x_{00}$.

Then interpolated pixel signals at points $x_{10}$, $x_{20}$ and $x_{30}$ are calculated in similar manner.

Figure 15:
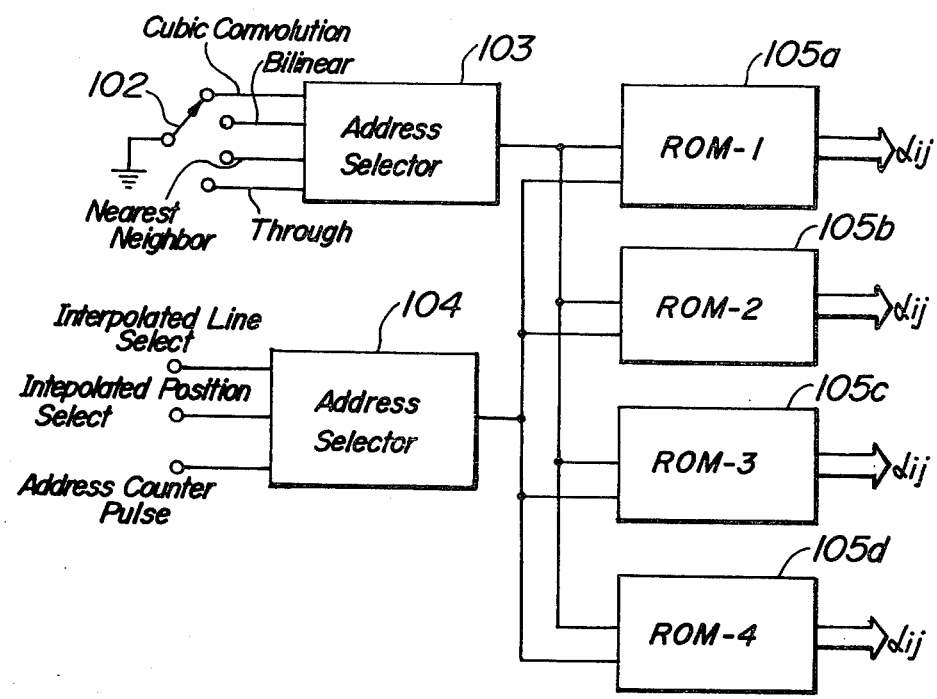
FIG. 15 is a block diagram showing ROMs and their circuits.
Figure 16:
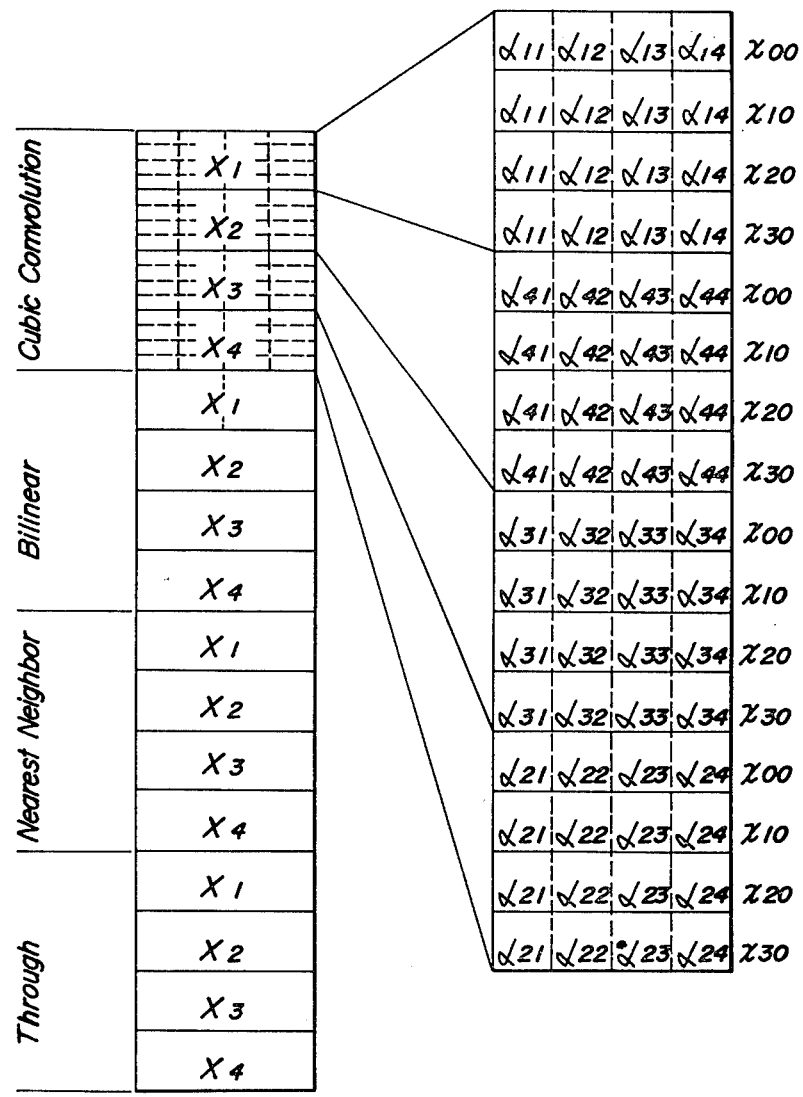
FIG. 16 is a diagram illustrating an interior construction of ROM.

FIG. 15 is a block diagram showing a circuit including the ROMs for storing the pixel coefficients. There is provided a manually operated selection switch 102 having four contacts laveled as CUBIC CONVOLUTION, BILINEAR, NEAREST NEIGHBOR and THROUGH. If the switch 102 is connected to the THROUGH contact, no interpolation is effected. These contacts are connected to an address selector 103 which then selects given storage positions in the ROM-1 to ROM-4 105a to 105d. The internal construction of each ROM is shown in FIG. 16. Each ROM is first divided into four sections denoting the four kinds of interpolation including the THROUGH, and each section is subdivided into four regions $X_1$, $X_2$, $X_3$, $X_4$ denoting the four interpolation areas. Further each region is subdivided into four rows corresponding to the four interpolated pixels $x_{00}$, $x_{10}$, $x_{20}$, $x_{30}$ and each row contains four pixel coefficients. For instance, in the rows $x_{00}$ to $x_{30}$ of the four regions $X_1$, $X_2$, $X_3$, $X_4$ of the ROM-1 there are stored $\alpha_{11}, \ldots, \alpha_{14}$; $\alpha_{41}, \ldots, \alpha_{44}$; $\alpha_{31}, \ldots, \alpha_{34}$; $\alpha_{21}, \ldots, \alpha_{24}$, respectively. In the rows $x_{00}$ to $x_{30}$ of the four regions $X_1$ to $X_4$ of the second ROM-2, there are stored $\alpha_{21}, \ldots, \alpha_{24}$; $\alpha_{11}, \ldots, \alpha_{14}$; $\alpha_{41}, \ldots, \alpha_{44}$; $\alpha_{31}, \ldots, \alpha_{34}$; respectively. Similarly, in the rows $x_{00}$ to $x_{30}$ of the regions $X_1$ to $X_4$, there are stored $\alpha_{31}, \ldots, \alpha_{34}$; $\alpha_{21}, \ldots, \alpha_{24}$; $\alpha_{11}, \ldots, \alpha_{14}$; $\alpha_{41}, \ldots, \alpha_{44}$; respectively and in the rows $x_{00}$ to $x_{30}$ of the regions $X_1$ to $X_4$ are stored $\alpha_{41}, \ldots, \alpha_{44}$; $\alpha_{31}, \ldots, \alpha_{34}$; $\alpha_{21}, \ldots, \alpha_{24}$; $\alpha_{11}, \ldots, \alpha_{14}$, respectively. These coefficients stored in the ROMs 105a to 105d are selectively read out under the control of address signals supplied from the address selectors 103 and 104. To this end, to the address selector 104 are supplied an interpolated line selected signal, an interpolated area selected signal and an address counter pulse. In the present embodiment, the positions of interposition may be changed by exchanging the ROMs. For instance, when the positions $x_{00}$, $x_{10}$, $x_{20}$ and $x_{30}$ to be changed into center positions $x_{02}$, $x_{12}$, $x_{22}$ and $x_{32}$ shown in FIG. 10, ROMs containing the pixel coefficients which are calculated in accordance with the equation (6) for the relevant positions $x_{02}$, $x_{12}$, $x_{22}$ and $x_{32}$ may be set into the interpolator. Furthermore, the number of scanning lines may be also, changed by exchanging ROMs. In FIG. 16, the pixel coefficients $\alpha_{11}-\alpha_{14}$ are indicated as the same for the interpolated rows $x_{00}-x_{30}$, but actually the values thereof are different each other according to the rows to be interpolated on the basis of the formula mentioned above.

Figure 17:
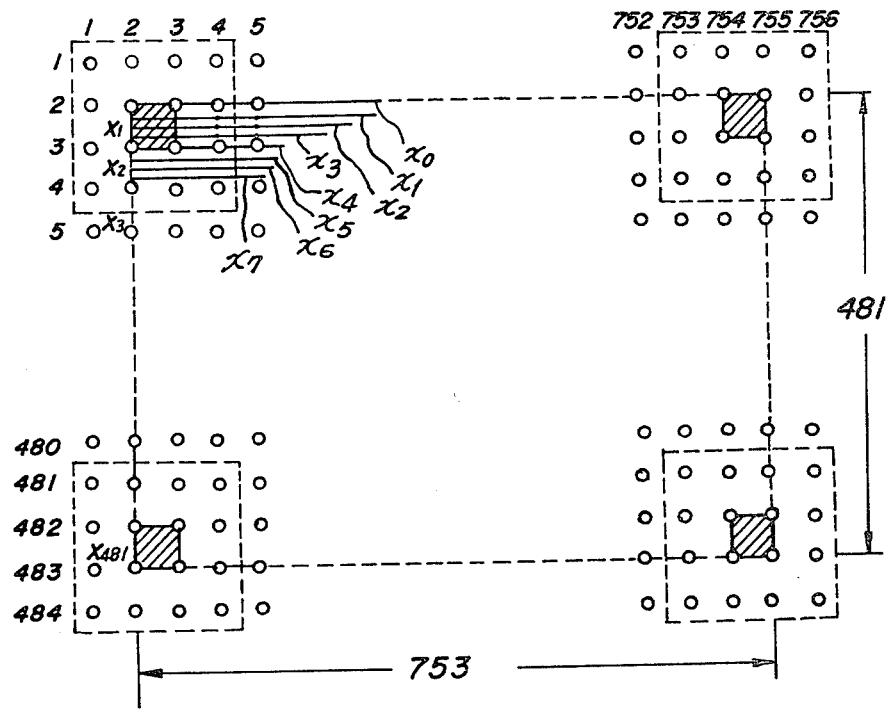
FIG. 17 is a diagram for explaining the interpolation order and interpolation region.

FIG. 17 is a diagram showing an interpolation order. At first a region $X_1$ at a left upper corner is selected and a first scanning line $x_0$ is obtained by effecting the interpolation from left to right. The number of picture elements of the original line is 756, but the number of the picture elements of the interpolated line is 753. Therefore, three picture elements are lost during the interpolation, but this corresponds to only 0.4% of the original line. Then the rows of the regions $X_1$ of ROMs are changed from $x_{00}$ to $x_{10}$ and a next scanning line $x_1$ is derived. In this manner, successive lines $x_2$, $x_3$ are interpolated. Then the interpolation regions of ROMs are shifted from $X_1$ to $X_2$ and next four scanning lines $x_4$, $x_5$, $x_6$, $x_7$ are derived by the interpolation. In this case, as illustrated in FIG. 12C, the fifth line data is stored in the line RAM 97a. In this manner, the interpolation is carried out up to the last region $X_{481}$ (corresponding to the regions $X_1$ in ROMs) to obtain all of the interpolated picture elements of the single frame. In this case, since the number of the interpolation regions is 481, while the number of the original scanning lines is 484, three scanning lines are lost. However, this corresponds to only 0.62% of the original scanning line.

FIG. 18 is a block diagram showing one embodiment of the color film photography unit 41 according to the invention. As shown in FIG. 18, the digital R, G, B signals supplied from the interpolator to the photography unit 41 are respectively converted into an analog signal by D/A converters 110R, 110G and 110B, and then their tones are corrected by tone correctors 111R, 111G and 111B, respectively installed in the photography unit. The tone correction is performed so as to obtain a good image having the best tone corresponding to a sensitivity characteristic of a color film to be used. As shown in FIGS. 19A to 19E, various tone corrections such as gamma correction for compensating an exponential characteristic, parallel shift correction for adjusting both bright and dark tones, contrast correction for adjusting a linear variation rate, high light correction for adjusting a contrast of a bright portion, and shadow correction for adjusting a contrast of a dark portion, each showing a relation between an amount of exposure and a film density. In the photography unit 41 according to the invention, the above mentioned corrections can be performed, but, since the tone corrections except for the gamma correction are carried out in the tone corrector 34 before the photography unit 41, only the gamma correction may be performed here.

The video signal after effecting the tone corrections is supplied to a flying spot scanner tube (FSS tube) 113 through a selection switch 112. The switch 112 is driven in synchronism with an operation of a filter member 114 comprising R, G, B filters 114R, 114G and 114B under the control of a controlling unit 115 in such a manner that the R, G, B signals can be selectively supplied to the FSS tube 113. The filter 114 having a circular disc on which the color filters are arranged is rotated mechanically by a motor 116 under the control of the control unit 115. Moreover, since use is made of a still camera 117 using a large size film 118 of 6×4.5 mm or 6×9 mm, it is possible to improve the resolution extremely as compared with a small size film of 16 mm or 35 mm. Furthermore, a shutter 119 installed in the camera 117 is released in synchronism with the R, G, B filter member 114 under the control of the controlling unit 115.

Figure 20A:
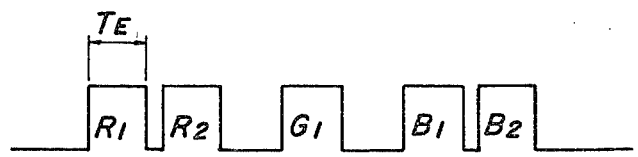
FIGS. 20A and 20B are waveforms for explaining operations of a shutter and a filter member in the photography unit.
Figure 20B:
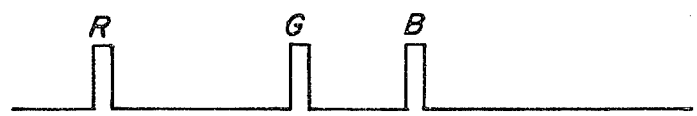
Figure 21:
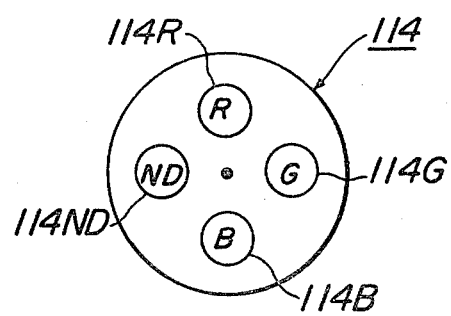
FIG. 21 is a plan view illustrating an embodiment of the filter member.

FIGS. 20A and 20B are schematic views showing a mutual relation between the shutter operation and the filter operation for exposing successively the R, G, B images on the color film 118. That is to say, the shutter 119 is released five times for exposing the R, G, B images by two, one and two times, respectively, so as to eliminate a registration discrepancy as shown in FIG. 20A. An each exposure time $T_E$ is set to about 2.25 seconds in conjunction with the interpolation. FIG. 20B show a driving signal for rotating the filter member 114 is synchronism with the exposure. FIG. 21 is a plan view showing one construction of the R, G, B filter member 114. As shown in FIG. 21, an ND (neutral density) filter 114ND is arranged in addition to the R, G, B filters 114R, 114G and 114B, and is used for making a black and white film. In this case, the G signal which resembles the Y signal and has the widest frequency range in the R, G, B signals serves to obtain the black and white film through the ND filter 114ND.

Figure 22:
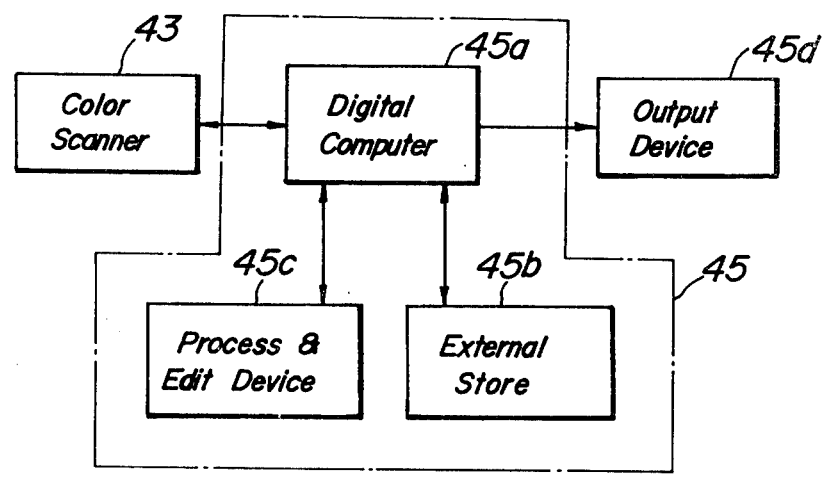
FIG. 22 is a block diagram depicting a construction of a layout scanner.

FIG. 22 is a block diagram showing one embodiment of the layout scanner system 45 shown in FIG. 3. The analog video signal supplied from the color scanner 43 is first converted into a digital video signal by a digital computer 45a and the digital video signal is once stored in an external store 45b which may comprise one or more large size magnetic disc device of about 300M bits. The system further comprises an image processing and editing device 45c having key board, digitizer, monitor display, etc. An operator can input page layout information for a layout sheet with the aid of these operating members. The page layout information thus produced may be once stored via the digital computer 45a in said external store 45b or an additional store. In case of effecting a page make-up, the page layout information is read out on the display monitor by a command provided by the key board of the processing and editing device 45c. Further, the video signal is read out of the external store 45b and is inserted into a given trimming position. Then a command of a mask is entered and the image information outside a trimmed portion is all erased. In this manner, the necessary image is selected. If the tone of the selected image is not satisfactory, a retouching may be performed. There are further functions or commands such as superimposition of images, tint laying, etc. other than the shift of image, masking and retouching. After the page make-up treatment by the operator has been finished, the image information is stored in the magnetic disc device through the digital computer 45a. Then it is possible to read out the image information thus stored and the read out information may be supplied to the color scanner 43 to form the color separation films. It should be noted that the layout scanner system 45 may comprise an output device 45d for forming a hard copy or film of the image information. By providing the layout scanner system explained above, it is possible to automatically process the major printing works such as photography process, mask formation, superimposition, correction, etc. which have been carried out manually in the known process.

Figure 23:
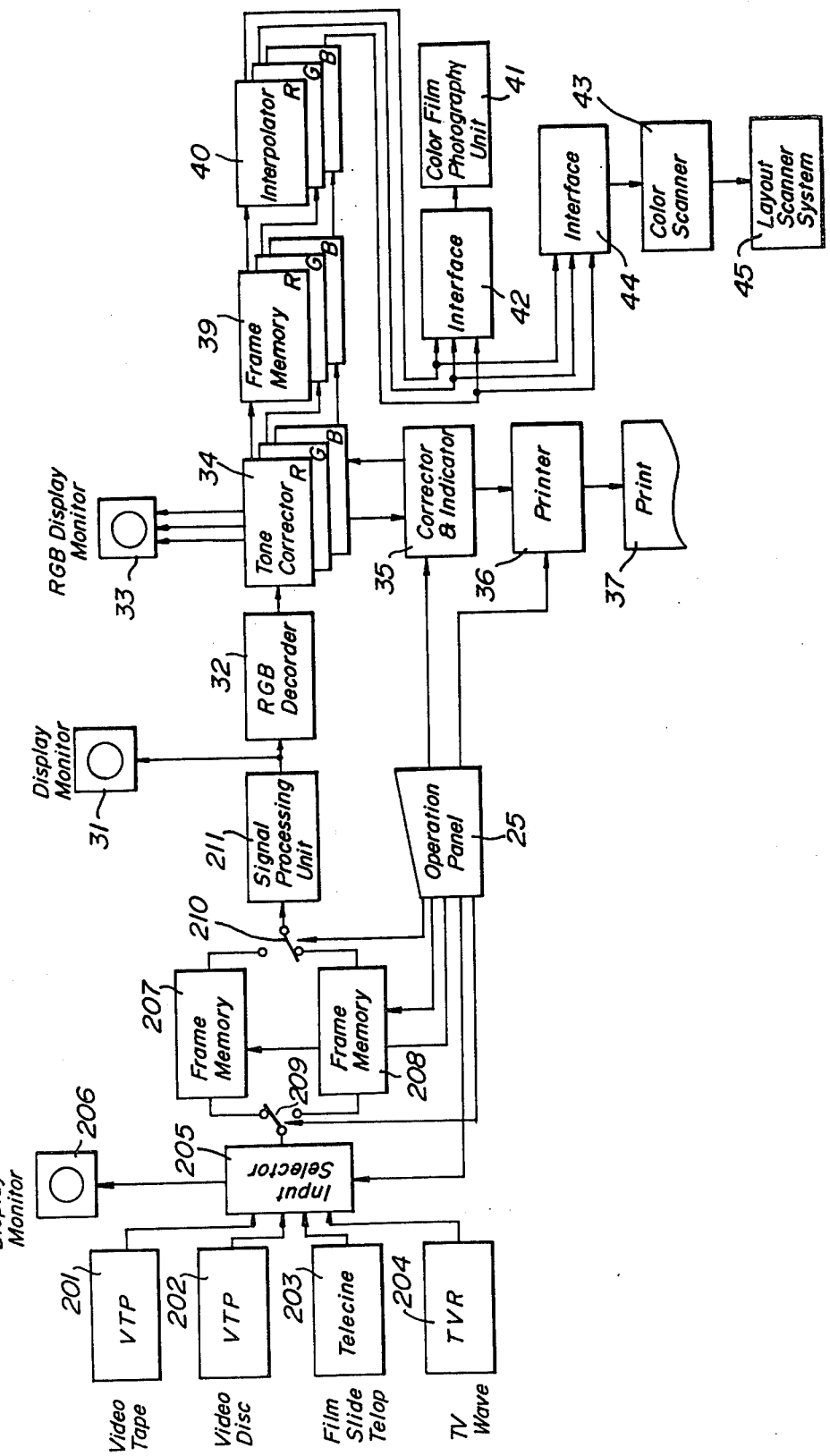
FIG. 23 is a block diagram illustrating a second embodiment of the video printing system according to the invention.

FIG. 23 is a block diagram showing another embodiment of the video printing system according to the invention. In the previous embodiment shown in FIGS. 2 and 3, as the original video signal source use is made of the ¾" video cassette tape 11 and the original video signal is re-recorded on the 1" video tape 18. Therefore, the video signal source and the main unit of the video printing system are separated from each other. Contrary to this in the present embodiment, various kinds of the video signal sources may be used and the video signal sources may be coupled with the video printing system. Therefore, the video printing apparatus of the present embodiment may be termed as on-line system.

As illustrated in FIG. 23, the video signal sources may be video tapes, video disc, film, slide, telop and television broadcasting wave. In order to generate the video signals from these video signal sources there are arranged a video tape player 201, a video disc player 202, a telecine device 203 and a television receiver 204. One of these video signals is selectively extracted by an input selector 205 and the extracted video signal is reproduced by a display monitor 206. The input selector 205 can be driven by an operation console 25. The input selector 205 comprises an A/D converter for converting the selected analog video signal to a digital video signal. When a desired scene is displayed on the monitor 206, an operator actuates a selection switch on the console 25, the digital video signal of the selected frame is supplied to one of two frame memories 207 and 208 (in the situation shown in FIG. 23, the frame memory 207) via a switch 209 which is driven by the operation console 25. In the other frame memory 208 the video signal has been stored and is read out via a switch 210 which is also actuated by the console 25.

The video signal read out of the frame memory 208 is processed by a video signal processing unit 211 including the time base corrector, noise reducer and detail corrector. The video signal processed by the unit 211 is displayed on a display monitor 31 and at the same time is supplied to an R, G, B decoder 32. Circuit portions following the decoder 32 are entirely same as that of the previous embodiment shown in FIG. 3 and thus, its explanation is omitted, while portions which correspond to those of the previous embodiment are denoted by the same reference numerals used in FIG. 3.

Figure 24:
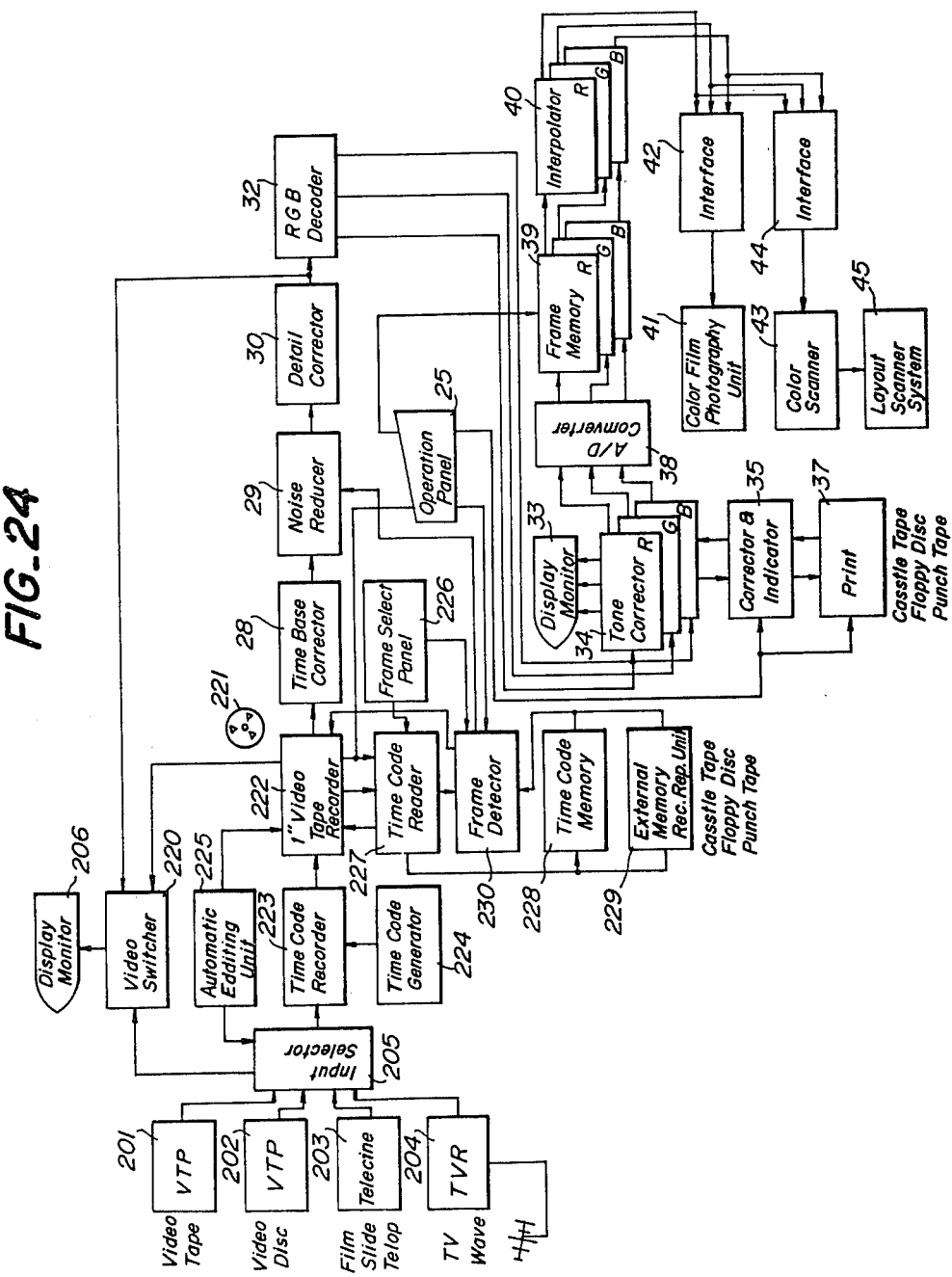
FIG. 24 is a block diagram illustrating still another embodiment of the video printing apparatus according to the invention.

FIG. 24 is a block diagram showing still another embodiment of the video printing apparatus of the on-line type according to the invention. In the present embodiment use is made of a 1" video tape recorder instead of the frame memories 207, 208. In the present embodiment parts which are similar to those of the previous embodiments are denoted by the same reference numerals used in FIGS. 3 and 23. In the present embodiment, a plurality of video signal sources such as ¾" video cassette tape, video disc, film, slide, telop and television broadcasting wave may be used by means of a ¾" video tape player 201, a video disc player 202, a telecine device 203 and a television receiver 204. Any desired one of them may be extracted by an input selector 205. The extracted video signal may be displayed by a display monitor 206 via a video switcher 220. At the same time, the extracted video signal is re-recorded on a 1" video tape 221 by means of a 1" video tape recorder 222. During this dubbing operation, a time code generated from a time code generator 224 is also recorded by a time code recorder 223 on a control track of the 1" video tape 221. The dubbing is controlled by an automatic editing unit 225. In this manner, the video signal is recorded on the 1" video tape 221 in such a manner that the particular time codes are denoted for respective frames. By means of the time codes it is possible to extract desired frames in an accurate and easy manner. In case of using another video signal source, the video signal may be recorded on the 1" video tape 221 together with the time codes.

The 1" video tape loaded in the 1" video tape recorder 222 is rewound and then the recorded video signal is reproduced. The reproduction may be effected by controlling the automatic editing unit 225 in the slow and stop reproduction modes. The reproduction video signal is displayed on the monitor 206 via the video switcher 220. Since the monitor 206 comprises a Y/C separation decoder and a high resolution Braun tube, it is possible to display the image having a higher quality than in usual monitors. The operator may select desired frames by actuating a frame select switch provided on a frame selection panel 226. That is to say, when the frame select switch is actuated, the time code recorded in the relevant frame on the 1" video tape 221 is read out by a time code reader 227 and the read out time code is registered in a time code memory 228. The read out time codes may be further recorded on an external memory such as a magnetic cassette tape, floppy disc and punch tape by means of an external memory recording and reproducing unit 229.

In case of forming the color film or color separation films, from the 1" video tape 221, the video tape 221 is loaded in the 1" video tape recorder 222. In case of using the time code data stored in the time code memory 228, a frame extract switch on the frame select panel 226 is actuated. Then the time codes stored in the memory 228 are successively read out in the order of recording them and are supplied to a frame detector 230. Contrary to this, when the external memory is used, the external memory is set in the external memory recording and reproducing unit 229 and the time codes stored in the external memory are read out successively upon the actuation of the frame extract switch.

The 1" video tape 221 is set in the 1" video tape recorder 222 and the video signal on the 1" video tape 221 is reproduced. At the same time, the time codes on the tape 221 are supplied to the frame detector 230 and are compared with the time code supplied from the time code memory 228 or the external memory recording and reproducing unit 229. When these time codes are detected to be identical, the frame detector 230 sends a freeze command to a noise reducer 29. Then, the currently reproduced video signal of the relevant frame is stored in a frame memory provided in the noise reducer 29. At the same time, the frame detector 230 sends a stop signal to the 1" video tape recorder 222 to stop its reproducing operation. During the reproducing operation of the 1" video tape recorder 222, the reproduced video signal is displayed on a display monitor 33. Then the stored video signal is processed in the same manner as the previous embodiments.

Figure 25:
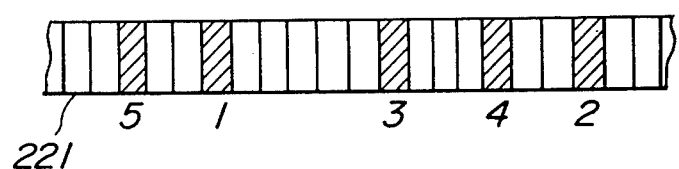
FIG. 25 is a schematic view for explaining a manner of extracting the desired frames.

After the process of the relevant frame has been finished, the frame extract switch on the frame select panel 226 is actuated again. Then the 1" video tape recorder 222 is made operative again. At the same time, a next time code stored in the time code memory 228 or the external memory is read out and is supplied to the frame detector 230. As shown in FIG. 25, if the next frame No. 2 to be extracted is placed at a forward position on the tape 221 with respect to the first frame No. 1 which has been extracted, the 1" video tape 221 is fed forwardly in a fast forward mode to index the frame No. 2. Then the video signal of the relevant frame No. 2 is freezed in the noise reducer 29. After the relevant frame has been processed to form a color film or color separation films, a next frame No. 3 is extracted. In this case, the 1" video tape 221 is rewound up to the frame No. 3. In this manner, the selected frames are successively extracted with the aid of the time codes and the 1" video tape recorder 222 is controlled by a micro computer in accordance with the data stored in the time code memory 228 or the external memory.

In the present embodiment, the successive frames are extracted by actuating the frame extract switch provided on the frame select panel 226. However, this frame extracting operation may be carried out automatically by detecting the completion of the color film or color separation film formation. In this case it is possible to initiate to index a next frame even if the film formation has not yet been completed as long as the content of the frame memory in the noise reducer 29 may be rewritten. This results in further improvement in the process efficiency. Moreover, the selected frames may be extracted in the order of the time codes or in any desired order in accordance with a given priority, if any.

Figure 26:
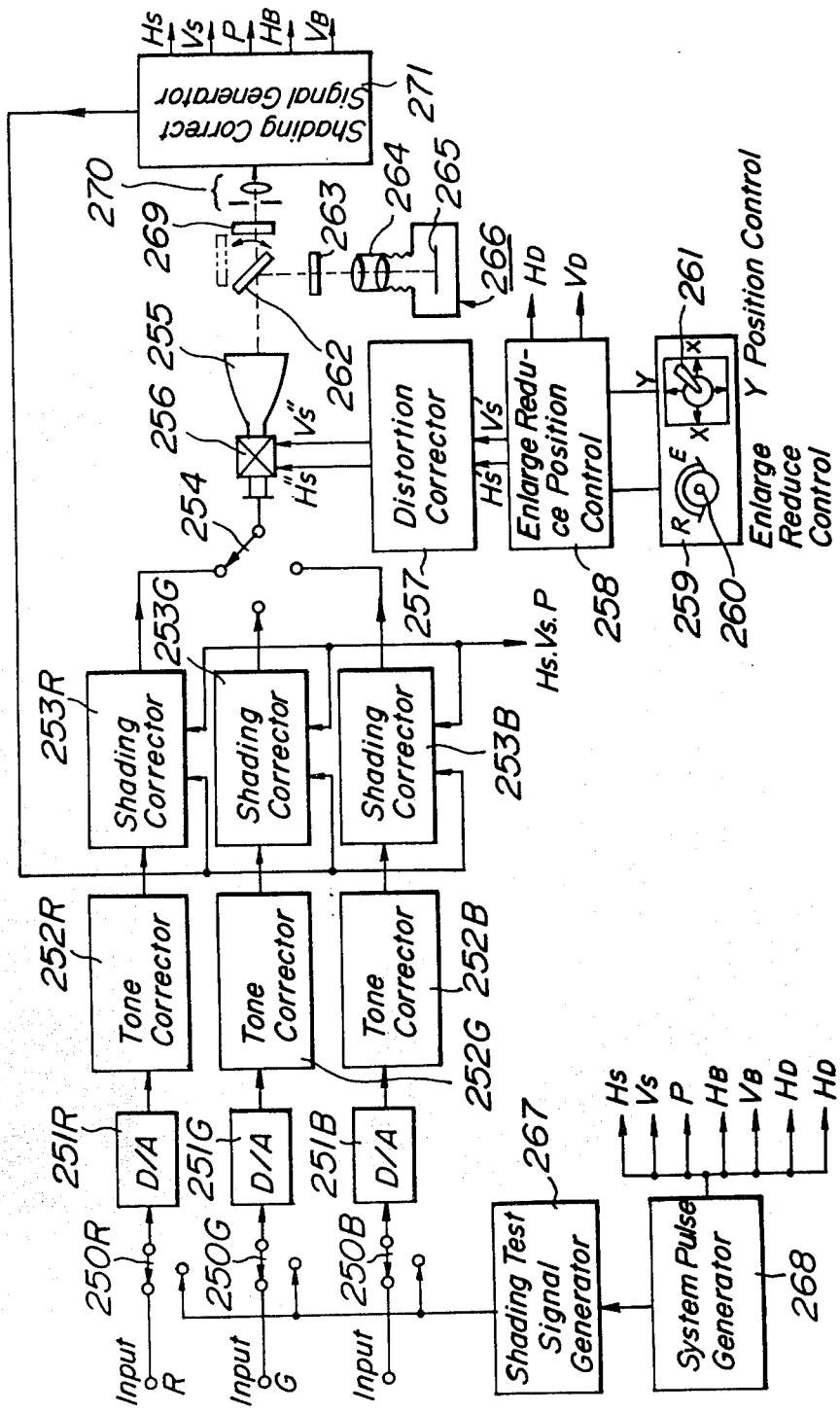
FIG. 26 is a block diagram showing another embodiment of a color photography unit according to the invention.

FIG. 26 is a block diagram showing another embodiment of the color film photography unit 41. In this embodiment, the R, G and B signals from the interpolator 40 are supplied via switches 250R, 250G and 250B and D/A converters 251R, 251G and 251B to tone correctors 252R, 252G and 252B. In the tone correctors, the gamma, brightness (parallel shift), contrast (gradient) high light and shadow are controlled in the same manner as that explained with reference to FIGS. 19A to 19E. These corrections can be effected for respective colors. The R, G and B signals having the tone corrected are supplied to shading correctors 253R, 253G and 253B in which the R, G and B signals are modulated by a shading correction signal which will be explained later. The R, G and B signals thus corrected are successively supplied by means of a switch 254 to a brightness modulation terminal of a flying spot scanner tube (FSS tube) 255. The FSS tube has a deflection device 256 to which horizontal and vertical deflection signals which are corrected and adjusted by a deflection distortion correcting circuit 257 and an enlargement, reduction and position control circuit 258. To this end the control circuit 258 is connected to a control panel 259 having an enlargement and reduction control dial 260 and a joy-stick 261 for adjusting a position of a raster on the FSS tube 255.

The image formed on the FSS tube 255 is projected via a swingable mirror 262, a color filter member 263 and an optical system 264 onto a color film 265 set in a still camera 266. The filter member 263 has the same construction as that illustrated in FIG. 21 and include red, green and blue color filters. The filter member 263 is driven in conjunction with the switch 254 in such a manner that when the red signal is selected by the switch 254, the red filter is inserted in an optical path. In this manner the number of exposures of the color image may be selected in accordance with the spectrum characteristics of the FSS tube 255 and the color film 265. Further, the red, green and blue images are projected onto the color film 265, while the film is set stationarily in the camera 266, a so-called registration error does not occur. Moreover, use may be made of the film 265 of a large size and thus, the color film of having the high resolution can be obtained.

Now the method for correcting the shading will be explained. In order to form a shading correction signal which serves as a standard for the shading correction, the switches 250R, 250G and 250B are changed into a shading test signal generator 267 which is connected to a system pulse generator 268. The shading test signal formed by the system pulse generator 268 is supplied via the D/A converters 251R, 251G, 251B, the tone correctors 252R, 252G, 252B, the shading correctors 253R, 253G, 253B and the switch 254 to the FSS tube 255 to form a raster image on the FSS tube. The mirror 262 is removed from the optical path as illustrated by a chain line in FIG. 26. Then the raster image formed on the FSS tube is projected by means of a filter member 269 similar to the filter member 263, an optical system 270 similar to the optical system 264 of the camera 266 onto a shading correction signal generator 271.

Figure 27:
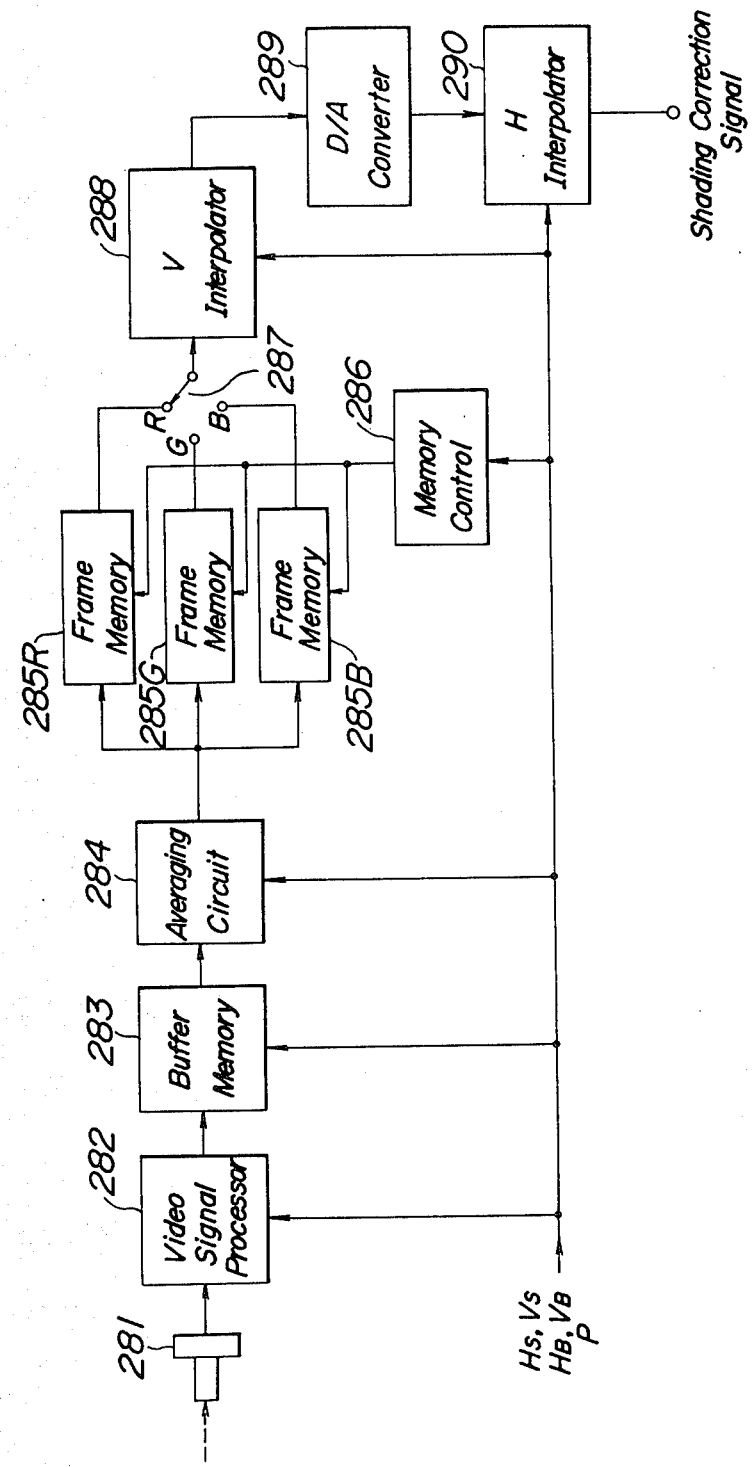
FIG. 27 is a block diagram illustrating a shading correct signal generator in FIG. 26.
Figure 28:
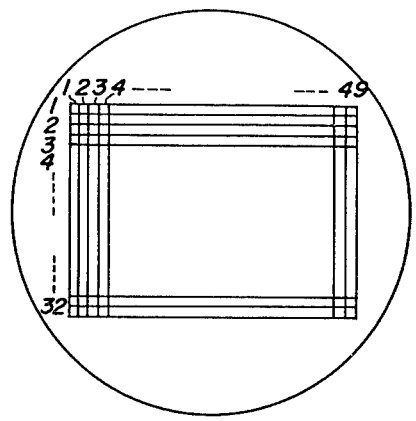
FIG. 28 is a plan view showing a raster divided into blocks.

FIG. 27 is a block diagram showing an embodiment of the shading correct signal generator 271. The raster image is received by a photomultiplier 281 to be converted into an electrical signal. The signal is supplied to a video signal processor 282 in which every four scanning lines are extracted and then every other pixels of the extracted scanning line are sampled and held to produce digital pixel signals. Then successive eight pixels are summed up to produce a sum which is then supplied to a buffer memory 283 and is stored therein. In an averaging circuit 284, an average of sixteen sums of sixteen scanning lines extracted from sixty four scanning lines is calculated. The calculated value represents an average of the pixels in a block consisting of $(2\times8)\times64=1,024$ pixels. Since, the raster is composed of about 2,000 scanning lines, the raster image on the FSS tube 255 is divided into 49 blocks in the horizontal direction and 32 blocks in the vertical direction as illustrated in FIG. 28 and the total number of the blocks in the raster is $49\times32=1,568$. Differences is the average values of these blocks represent the shading. In general, the shading generated by the FSS tube 255 and the optical system 264 or 270 has such a property that the brightness is high in a central portion and is gradually decreased toward a peripheral portion. Therefore, the shading can be accurately detected by dividing the raster into 1,568 blocks. The average values of the blocks for the respective color images are stored in frame memories 285R, 285G and 285B under the control of a memory control circuit 286. As shown in FIG. 27, the video signal processor 282, buffer memory 283, averaging circuit 284 and memory control circuit 286 are controlled by horizontal and vertical synchronizing signals Hs and Vs, horizontal pixel signal P, horizontal and vertical block signals $H_B$ and $V_B$ and other necessary signals. Since the calculation for deriving the average values can be performed at a slow speed, the averaging circuit 284 may be composed of a micro computer.

When the color film or color separation films are to be formed, the switches 250R, 250G and 250B are changed into the positions shown in FIG. 26 and the switch 287 is connected to one contact, e.g. R contact. Then the shading correction data stored in the frame memory 285R is read out and is converted by a D/A converter 289 into an analog signal which is supplied to the shading corrector 253R. As explained above, the shading correction data is obtained by averaging pixel signals in respective blocks and therefore, there might be produced discontinuity between successive blocks. In order to avoid such an undesired discontinuity, in the present embodiment, an interpolation is effected in both vertical and horizontal directions. This interpolation for the shading correct signal is substantially similar to that for the video signal.

As illustrated in FIG. 27, the shading correct signal is first interpolated in the vertical direction by a V interpolator 288 and then the interpolated signal is converted by the D/A converter 289 into the analog signal. Next, the analog signal is interpolated in the horizontal direction by means of an H interpolator 290 to obtain the interpolated shading correct signal. In the H interpolator 290, the interpolation is effected by changing the block data linearly in the horizontal direction. It should be noted that the reproducibility of the image in the horizontal direction is inherently high, because the video signal is derived as a continuous signal in the horizontal direction, but the resolution in the vertical direction is low. Therefore, in the present embodiment, the interpolation in the vertical direction is effected in the cubic convolution method. As explained above, since the one block contains 64 scanning lines, 64 points must be interpolated within each block. In this case, the pixel coefficients may be similarly expressed by the equations (1) to (5) just like as the case of interpolation for the video signal. Therefore the detailed explanation of the interpolation for the shading correct signal is omitted.

Figure 29:
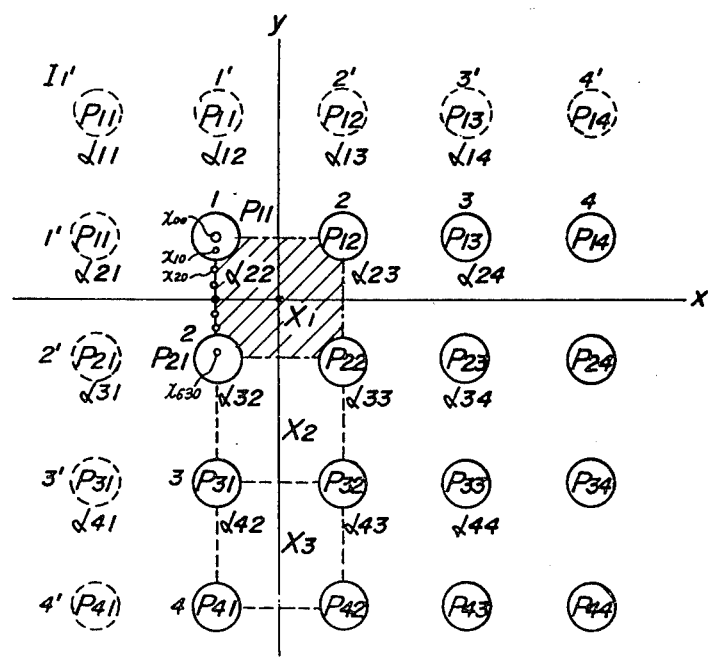
FIGS. 29 and 30 are diagrams for explaining an interpolation for obtaining the shading correct signal.
Figure 30:
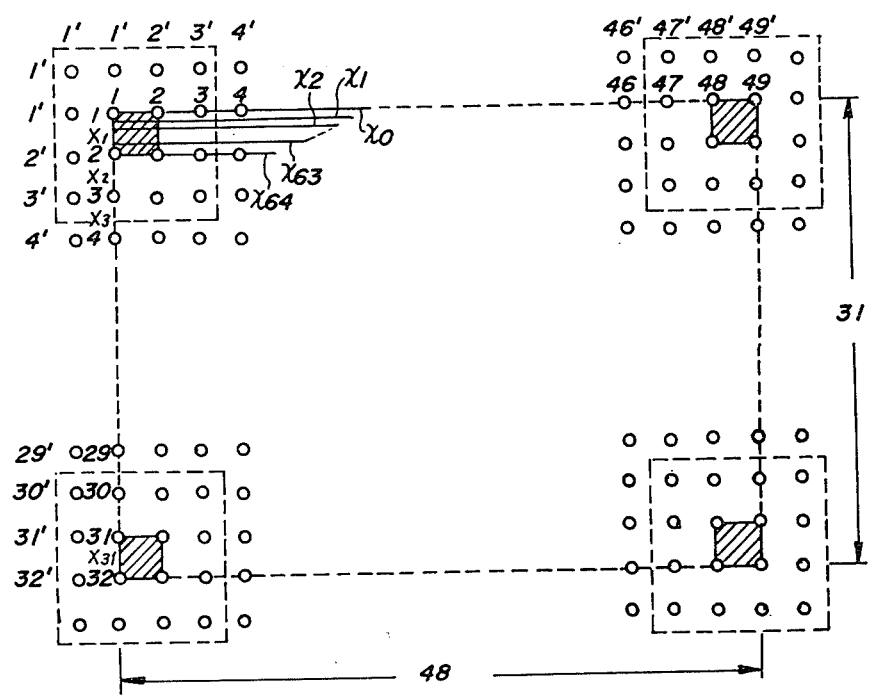

FIG. 29 is a diagram for explaining the interpolation. In the present embodiment, in order to avoid a possible reduction of data along the periphery of the raster image, imaginary block data $1'$, $2'$, $3'$... are formed by using the peripheral block data $P_{11}$, $P_{12}$, $P_{13}$...; $P_{21}$, $P_{31}$.... Therefore, in case of interpolating a first pixel $X_{00}$ in a first region $X_1$, the shading correction data $P_{11}$, $P_{11}-P_{13}$; $P_{11}$, $P_{11}-P_{13}$; $P_{21}$, $P_{21}-P_{23}$; $P_{31}-P_{33}$; are stored in four line RAMs corresponding to those 97a to 97d in FIG. 13. Then the pixel coefficients stored in ROMs corresponding to those 105a to 105d in FIG. 15 are read out. That is to say, the coefficient stored in the first rows of the first regions $X_1$ of these ROMs are read out. These coefficients are $\alpha_{11}$, $\alpha_{12}$, $\alpha_{13}$, $\alpha_{14}$; $\alpha_{21}$, $\alpha_{22}$, $\alpha_{23}$, $\alpha_{24}$; $\alpha_{31}$, $\alpha_{32}$, $\alpha_{33}$, $\alpha_{34}$; $\alpha_{41}$, $\alpha_{42}$, $\alpha_{43}$, $\alpha_{44}$, respectively. Then the multiplicating and summing are effected in the same manner as that explained before with reference to FIGS. 14A and 14B to obtain the interpolated shading correct signal at the point $X_{00}$. In this manner, the interpolation for successive points $X'_{00}$, ... along a first line can be carried out. Then the interpolation along a second line is effected by using the coefficients stored in the second row $X_{10}$ in the region $X_1$. In this manner sixty four lines $X_0$ to $X_{63}$ are produced as illustrated in FIG. 30. Then the shading correct data along the first line in the first line RAM is replaced by the fifth shading correct data $P_{51}$, $P_{51}$, $P_{52}$... and the interpolation is effected with the aid of the coefficient stored in the second regions $X_2$ of the ROMs to derive further sixty four lines $X_{64}$ to $X_{127}$. In this manner, the interpolation for the whole raster is effected to obtain the interpolated shading correct signal along about 2,000 lines.

FIG. 31 shows a construction of the ROM for use in the above interpolation. The ROM is divided into four regions $X_1$ to $X_4$ and each region is subdivided into sixty four rows $X_{00}$, $X_{10}$...$X_{630}$. In the rows $X_{00}$ to $X_{630}$ of the regions $X_1$ to $X_4$ of the first ROM-1 there are stored the coefficients $\alpha_{11}$,...,$\alpha_{14}$; $\alpha_{41}$,...,$\alpha_{44}$; $\alpha_{31}$,...,$\alpha_{34}$; $\alpha_{21}$,...,$\alpha_{24}$; respectively. The remaining ROMs are also constructed in a similar manner.

In the above explanation, the points $X_{00}$, $X_{10}$...$X_{630}$ to be interpolated are situating on the arrays of the data points 1, 2, .... It should be noted that these points may be shifted into, for example, center lines between successive data points in the similar manner to that explained in the interpolation for the video signal. This may be effected simply by replacing the ROMs by another set of ROMs which store corresponding coefficients. As explained above, the total number of points to be interpolated is equal to $48\times68\times31=95,232$. Therefore, the interpolation for these points may be carried out within a shorter time than that required for effecting the interpolation for one and a half million pixels comprising the image of one frame. However, if the calculation for interpolating the shading correct signal is effected by a soft program of a computer, it is difficult to perform the interpolation over the whole image within about 2.25 seconds during which the image of the frame is displayed in the photography unit stably. Therefore, the interpolation for the shading correct signal is carried out by the hard logic circuit as explained above.

After the shading correct signal has been interpolated by the V interpolator 288, the correct signal is converted into the analog signal by the D/A converter 289 and then is supplied to the H interpolator 290 which comprises a miller integration circuit for effecting the interpolation in the horizontal direction.

Now the correction for the deflection distortion will be explained. As the deflection distortion there are a nonlinear distortion and a pincushion distortion and there have been proposed various correcting methods. Among these methods there is disclosed in a Japanese Patent Application Laid-Open Publication a method which can correct the pincushion distortion in four quadrants of the raster independently from each other and can also correct the nonlinear distortion in upper and lower halves and right and left halves with respect to a centerl horizontal and vertical lines, respectively. This method can effect the correction with a very high accuracy and is particularly suitable for a telecine device. In the present invention, since the still picture is processed and the registration can be carried out perfectly, it is possible to correct the distortions without effecting such a high grade correction, particularly the correction for the pincushion distortion. That is to say, it is sufficient to correct the pincushion distortion in respective two quadrants independently from each other.

Now it is assumed that horizontal and vertical deflection signals are denoted by H and V, and proportional coefficients are represented by $K_2$ and $K_3$. Then distortion corrected horizontal and vertical deflection signals $H_0$ and $V_0$ can be expressed by the following equations.

$$H_0 = K_3H - K_2K_3H^3 - K_2K_3HV^2 \quad (7)$$

$$V_0 = K_3V - K_2K_3V^3 - K_2K_3H^2V \quad (8)$$

In the above equations, the second terms express the nonlinear distortion and the third terms represent the pincushion distortion. In order to remove these distortions, the above deflection signals $H_0$ and $V_0$ must be supplied to the deflection coils.

Figure 32:
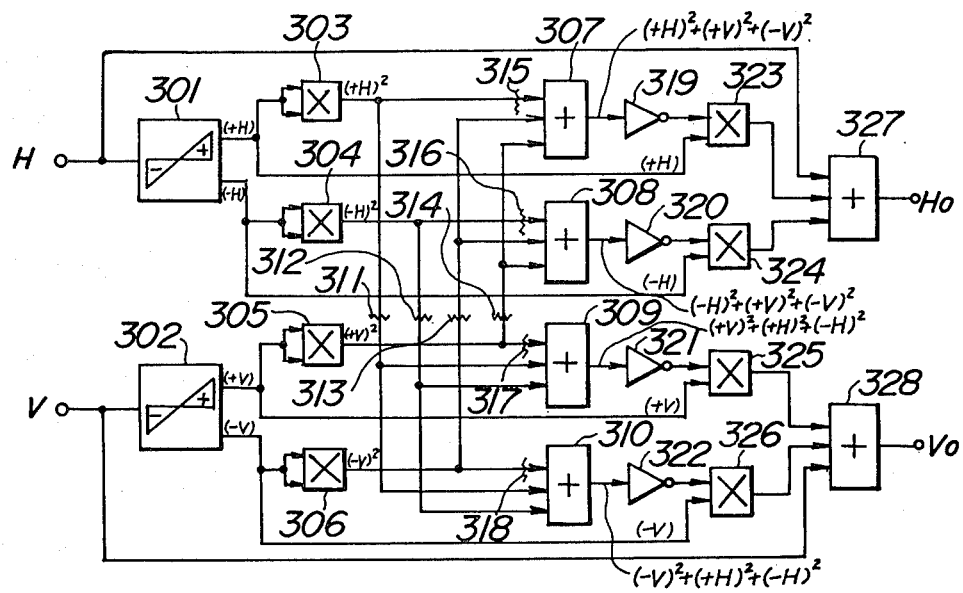
FIG. 32 is a block diagram illustrating a circuit for correcting the distortion of the raster image.
Figure 33:
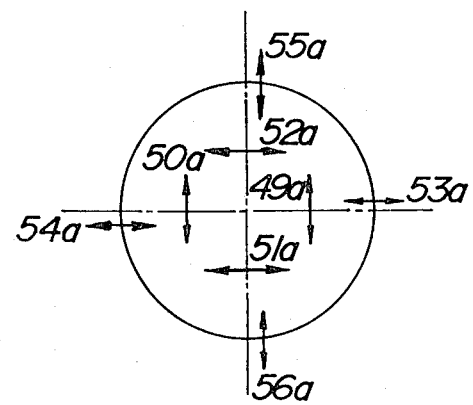
FIG. 33 is a diagram for explaining the distortion correction.

FIG. 32 is a block diagram illustrating an embodiment of the circuit 257 for correcting the deflection distortion in FIG. 26. Horizontal and vertical deflection signals H and V are supplied to rectifiers 301 and 302 which divide the deflection signals into positive and negative portions +H, −H and +V, −V, respectively. Then these positive and negative signal portions are supplied to multipliers 303 to 306 to produce $(+H)^2$, $(-H)^2$, $(+V)^2$ and $(-V)^2$ which are further supplied to adders 307 to 310 via variable resistors 311 to 318 to produce $(+H)^2+(+V)^2+(-V)^2$, $(-H)^2+(+V)^2+(-V)^2$, $(+V)^2+(+H)^2+(-H)^2$ and $(-V)^2+(+H)^2+(-H)^2$. In these signals variable gains adjusted by the variable resistors are omitted for the sake of simplicity. These signals are further supplied via inverters 319 to 322 to multipliers 323 to 326 together with the signals (+H), (−H), (+V) and (−V), respectively. Then output signals from the multipliers 323 and 324 are supplied to an adder 327 to which is also supplied the input signal H to produce the corrected horizontal deflection signal $H_0$. Similarly output signals from the multipliers 325 and 326 are supplied to an adder 328 together with the input signal V to produce the corrected vertical deflection signal $V_0$. These deflection signals $H_0$ and $V_0$ may be expressed as follows.

$$H_0 = H - \{H^3 + H(-V)^2 + H(-V)^2\} \quad (9)$$

$$V_0 = V - \{V^3 + V(+H)^2 + V(-H)^2\} \quad (10)$$

These equations (9) and (10) are equivalent to the equations (7) and (8), respectively explained above. In these equations, H in the term $H(+V)^2$ contains signal fractions in the first and second quadrants and $(+V)^2$ contains signal fractions also in the first and second quadrants. Therefore, this term $H(+V)^2$ represents a correction signal for the pincushion distortion in the horizontal deflection. That is to say, by adjusting the variable resistor 314 in FIG. 32, it is possible to adjust the horizontal pincushion distortion 314a in the first and second quadrants. Similarly, since the term $H(-V)^2$ contains correction signal fractions in the third and fourth quadrants, it is possible to adjust the horizontal pincushion distortion 313a in the third and fourth quadrants by adjusting the variable resistor 313. Further, the term $V(+H)^2$ contains correction signal fractions in the first and fourth quadrants and thus, by adjusting the variable resistor 311, it is possible to adjust the vertical pincushion distortion 311a in the first and fourth quadrants. Similarly, the vertical pincushion distortion 312a in the second and third quadrants can be adjusted by means of the variable resistor 312. The terms $H^3$ and $V^3$ in the equations (9) and (10) represent the right and left nonlinear distortions 315a, 316a and the upper and lower nonlinear distortions 317a and 318a, respectively. Therefore, these distortions can be adjusted by the variable resistors 315 to 318 independently from each other.

Figure 34A:
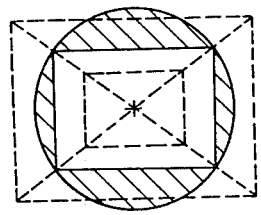
FIGS. 34A to 34I are schematic views for explaining enlargement and reduction of image size and positioning of the image on a film.
Figure 34E:
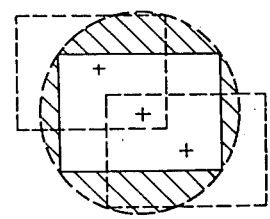
Figure 34B:
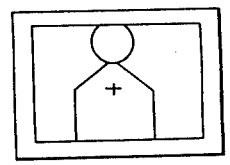
Figure 34F:
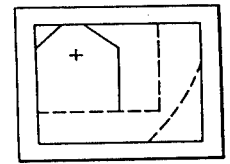
Figure 34C:
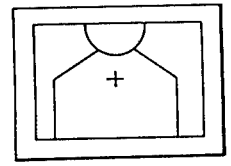
Figure 34G:
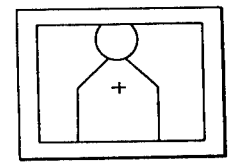
Figure 34D:
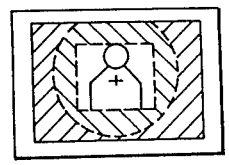
Figure 34H:
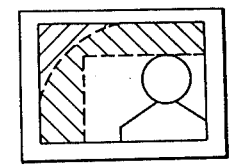
Figure 34I:
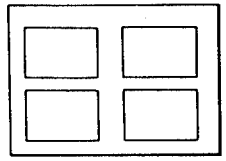

As explained above, in the present photography unit, it is possible to record a desired size image at desired position of a color film. Such a function is quite effective for an image trimming and editing. It is possible to effect the controllings of enlargement, reduction, and positioning by means of various methods. Now one method for effecting such control by adjusting the image displayed on the FSS tube will be explained. FIGS. 34A to 34I show schematic views explaining the operations of image enlargement, reduction, and positioning with respect to the image on the FSS tube. As shown in FIG. 34A, if the original image is enlarged or reduced by two times, the original image illustrated in FIG. 34B is enlarged or reduced as shown in FIG. 34C or FIG. 34D, respectively. As shown in FIG. 34E, if a direct current bias of the deflection voltage is varied so as to move an electron beam of the FSS tube left upward or right downward, the original image illustrated in FIG. 34G is moved left upward or right downward respectively as shown in FIG. 34F or FIG. 34H. Moreover, FIG. 34I is a schematic view showing one embodiment in case that four images which is reduced more than four times are recorded side by side on one film. The controlling circuit 258 for enlargement, reduction, and positioning in the embodiment shown in FIG. 26 is arranged for this purpose. It is possible to enlarge or reduce the image by adjusting amplitudes of horizontal deflection voltage $H_D$ or vertical deflection voltage $V_D$, respectively by means of the dial 260, and also to effect the positioning by changing the direct current biases of $H_D$ and $V_D$ by means of the joy-stick 261.

Further, it is a matter of course to perform the image enlargement and reduction by using a zoom lens and also by moving the position of the camera with respect to the image. However, in these methods, there occurs the drawbacks that the apparatus for performing the method is complicated and expensive and thus a handling thereof becomes inconvenient as compared with the electronic method mentioned above.

Furthermore, a trimming method is not limited to the embodiment shown in FIG. 34I, but it is possible to edit and photograph a plurality of images on one film by reducing them after trimming the enlarged desire portion of a certain image.

It should be noted that the enlargement and reduction of the image projected onto the color film may be effected by adjusting a zoom lens provided in the still camera, and that the position of the image on the color film may be effected by shifting the camera with respect to the flying spot scanner tube.

What is claimed is:

1. A video printing apparatus for forming from a color video signal color separation films and/or a color film comprises
    means for extracting a video signal of a desired frame in the input color video signal;
    frame memory means for storing pixel signals of the video signal of the extracted frame;
    means for reading out the pixel signals of video signal stored in said frame memory means;
    interpolating means for effecting an interpolation in accordance with the read out pixel signals to produce interpolated pixel signals;
    color photography means including a flying spot scanner tube for displaying black and white images of the interpolated pixel signals at a first scanning speed and means for projecting the images displayed on the flying spot scanner tube onto a color photographic film by means of color filters to form the color film;
    color scanner means for receiving the interpolated pixel signals to form color separation films at a second scanning speed; and
    means for controlling said reading out means in such a manner than when the color film is formed, the pixel signals stored in the frame memory means are read out at a first timing related to said first scanning speed, and when the color separation films are formed, the pixel signals are read out of the frame memory means at a second timing related to said second scanning speed.

2. An apparatus according to claim 1, wherein said interpolating means comprises a hard logic circuit which can produce the interpolated pixel signals in real time.

3. An apparatus according to claim 2, wherein said video signal extracting means comprises a video tape recorder for recording on a video tape the video signal supplied from at least one video signal source, a display monitor for displaying the video signal recorded on the video tape, a selection member for selecting the desired frame currently displayed on the display monitor and a frame memory for storing the video signal of the selected frame.

4. An apparatus according to claim 3, wherein said video signal extracting means further comprises a selection switch for selectively supplying to said video tape recorder one of a plurality of video signals from a plurality of video signal sources.

5. An apparatus according to claim 3, wherein said video tape is a video tape of one inch width and said video tape recorder is a helical scan type one inch video tape recorder.

6. An apparatus according to claim 3, wherein said video signal extracting means further comprising means for recording time codes on the video tape in such a manner that each frame is related to respective time code, means for selecting a time code related to a desired frame to be extracted, means for reading out the time codes recorded on the video tape, means for comparing the read out time codes with the selected time code to produce a coincidence signal when these time codes are identical with each other and means in response to said coincidence signal for extracting the video signal of the selected frame and supplying the extracted video signal to the frame memory.

7. An apparatus according to claim 6, wherein said video tape is a video tape of one inch width and said time codes are recorded in a control track of the video tape.

8. An apparatus according to claim 6, wherein said video signal extracting means further comprises a memory for storing the selected time code, means for reading the stored time code from said memory and supplying the read out time code to said comparing means, whereby the extraction of the video signal of th desired frames is performed automatically.

9. An apparatus according to claim 2, wherein said video signal extracting means comprises at least two frame memories for storing the video signal of the desired frame, a first switch for supplying the input video signal to one of said two frame memories and a second switch for reading out the video signal stored in the other frame memory.

10. An apparatus according to claim 2, further comprising video signal processing means for improving a quality of the extracted video signal of the desired frame.

11. An apparatus according to claim 10, wherein said video signal processing means comprises an A/D converter for converting the analog video signal of the extracted frame into a digital video signal, a digital time base corrector for correcting jitters and drop-outs in the digital video signal, a digital noise reducer for removing noise components in the digital video signal, a digital detail corrector for emphasizing contour components in the digital video signal, and a D/A converter for converting the digital video signal into an improved analog video signal.

12. An apparatus according to claim 2, further comprising a decoder for converting the video signal of the desired frame into R, G and B color signals and a tone corrector for correcting the tone of the R, G and B color signals.

13. An apparatus according to claim 12, wherein said tone corrector comprises a brightness adjuster, a contrast adjuster, a middle tone adjuster, a high light adjuster and a shadow adjuster.

14. An apparatus according to claim 13, wherein each of said adjusters has three volumes for adjusting the tone for respective color signals independently from each other and a volume for adjusting the tone totally.

15. An apparatus according to claim 14, wherein said tone corrector further comprises a memory for storing adjusted values of the volumes.

16. An apparatus according to claim 12, wherein said tone corrector further comprises means for measuring video voltages of the R, G and B color signals at any desired point in the image denoted by a cursor as percentage values with respect to white level standard voltages, and means for indicating the measured voltage values.

17. An apparatus according to claim 16, wherein said tone corrector further comprises a display monitor for displaying the tone corrected image of the desired frame and means for displaying the cursor superimposed upon the image, the position of the cursor on the image being able to be moved.

18. An apparatus according to claim 2, wherein the video signal of interlace scanning mode stored in the frame memory means is read out in a sequential scanning mode to avoid a pairing phenomenon.

19. An appartus according to claim 2, wherein said interpolating means is so constructed that any one of cubic convolution method, bilinear method and nearest neighbor method is selectively effected.

20. An apparatus according to claim 19, wherein said interpolating means further comprises means for passing the video signal without effecting the interpolation.

21. An apparatus according to claim 19, wherein the interpolation of the cubic convolution method is so effected that the interpolated pixels are aligned on arrays of the original pixels viewed in a vertical direction perpendicular to a scanning line direction.

22. An apparatus according to claim 19, wherein said interpolating means comprises a first memory for storing predetermined pixel coefficients for effecting the interpolation of the cubic convolution, bilinear and nearest neighbor methods, means for selectively reading out the necessary pixel coefficient belonging to the interpolation method to be effected, a second memory for storing the pixel signals of successive four scanning lines, and an interpolation calculating circuit for effecting necessary calculations for the pixel coefficients and pixel signals read out of the first and second memories.

23. An apparatus according to claim 22, wherein said interpolation calculating circuit comprises multipliers and adders.

24. An apparatus according to claim 22, wherein said first memory comprises ROMs and said second memory comprises RAMs.

25. An apparatus according to claim 24, wherein said first memory comprises four ROMs storing the same sets of pixel coefficients, but at different storage positions, and said second memory comprises four RAMs for storing the pixel signals of successive four scanning lines in such a manner that the pixel signals of a new scanning line and stored in a RAM from which the pixel signals of a scanning line has just been erased.

26. An apparatus according to claim 25, wherein each of said four ROMs is divided into four regions $X_1$ to $X_4$, each of which is subdivided into four rows, and in each of the four rows are stored a set of four pixel coefficient relating to each of four scanning lines which are used for the interpolation of the cubic convolution.

27. An apparatus according to claim 2, wherein said color photography means comprises means for setting the number of exposures of the same color image in accordance with spectrum characteristics of the flying spot scanner tube and the color photographic film to be used.

28. An apparatus according to claim 27, wherein said color photography means further comprises a tone corrector for correcting the tone of the R, G and B color signals independently from each other.

29. An apparatus according to claim 28, wherein said tone corrector comprises a gamma adjuster, a brightness adjuster, a contrast adjuster, a high light adjuster and a shadow adjuster.

30. An apparatus according to claim 27, wherein said color photography means further comprises means for correcting a shading of the flying spot scanner tube and an optical system of a camera for projecting the image displayed on the flying spot scanner tube onto the color photographic film.

31. An apparatus according to claim 30, wherein said shading correcting means comprises means for displaying on the flying spot scanner tube a standard raster image having a uniform brightness, means for receiving the standard raster image, by means of an optical system which has similar shading characteristics as those of an optical system inserted in an optical path between the flying spot scanner tube and the color photographic film, to produce a shading correct signal, means for storing the shading correct signal, means for reading out the stored shading correct signal in synchronism with the scanning of the flying spot scanner tube for displaying the images of the desired frame, and means for modulating the video signal supplied to the flying spot scanner tube with the read out shading correct signal.

32. An apparatus according to claim 31, wherein said standard raster is divided into a plurality of blocks and said means for storing the shading correct signal comprises means for deriving a representative value in each block from a plurality of pixel signals in each block.

33. An apparatus according to claim 32, wherein said representative value is formed by deriving an average value of a plurality of pixel signals in each block.

34. An apparatus according to claim 32, wherein said shading correcting means further comprises means for effecting an interpolation in accordance with the read out representative values to produce an interpolated shading correct signal.

35. An apparatus according to claim 34, wherein said interpolation is effected in a cubic convolution method.

36. An apparatus according to claim 27, wherein said color photography means further comprises a deflection distortion corrector for correcting a deflection distortion.

37. An apparatus according to claim 36, wherein said deflection distortion corrector comprises means for forming correction signals in the terms of $HV^2$ and $VH^2$ from horizontal and vertical deflection signals H and V and adding the correction signals thus formed to the horizontal and vertical deflection signals H and V, respectively, whereby pincushion distortions in first and second quadrants, third and fourth quadrants, first and fourth quadrants, and second and third quadrants can be corrected independently from each other.

38. An apparatus according to claim 36, wherein said deflection distortion corrector comprises means for forming correction signals in the terms of $H^3$ and $V^3$ from horizontal and vertical deflection signals H and V and for adding the corrected signals thus formed to the horizontal and vertical deflection signals H and V, whereby nonlinear distortions in first and second quadrants, third and fourth quadrants, first and fourth quadrants, and second and third quadrants can be corrected independently from each other.

39. An apparatus according to claim 2, wherein said color photography means further comprises means for adjusting horizontal and vertical deflection signals for the flying spot scanner tube to enlarge or reduce a size of the image displayed on the flying spot scanner tube.

40. An apparatus according to claim 2, wherein said color photography means further comprises means for adjusting D.C. vias potentials of horizontal and vertical deflection signals for the flying spot scanner tube to change a position of the image on the flying spot scanner tube.

41. An apparatus according to claim 2, wherein said color photography means comprises a zoom lens for projecting the image displayed on the flying spot scanner tube onto the color photographic film to enlarge or reduce a size of the image projected onto the film.

42. An apparatus according to claim 2, wherein said color photography means comprises means for shifting a position of the color photographic film with respect to the flying spot scanner tube.

43. An apparatus according to claim 42, wherein said color photography means further comprises means for projecting a reduced image onto the color photographic film, whereby a plurality of reduced images are recorded on the single film.

44. An apparatus according to claim 2, further comprising a layout scanner for storing the interpolated pixel signals of the desired frame.

* * * * *